United States Patent [19]
Lau-Kee et al.

[11] Patent Number: 5,631,974
[45] Date of Patent: May 20, 1997

[54] IMAGE PROCESSING

[75] Inventors: David Lau-Kee, Teddington; Gerhardt P. Otto, Guildford, both of United Kingdom; Yasuo Kozato, Woodside; Adam Billyard, Tooting, both of England

[73] Assignee: Canon Research Centre Europe, Ltd., Surrey, United Kingdom

[21] Appl. No.: 388,188

[22] Filed: Feb. 13, 1995

Related U.S. Application Data

[63] Continuation of Ser. No. 577,004, Sep. 4, 1990, abandoned.

[30] Foreign Application Priority Data

Aug. 31, 1990 [GB] United Kingdom ............... 9018996

[51] Int. Cl.$^6$ .................................................. G06K 9/00
[52] U.S. Cl. .............................................. 382/132; 382/302
[58] Field of Search ........................... 382/1, 276, 300, 382/303, 304, 132; 340/789; 395/155–161, 650

[56] References Cited

U.S. PATENT DOCUMENTS

| | | | |
|---|---|---|---|
| 4,763,288 | 8/1988 | Deering et al. | 364/200 |
| 4,815,024 | 3/1989 | Lewis | 364/802 |
| 4,901,221 | 2/1990 | Kodosky | 364/200 |
| 4,920,514 | 4/1990 | Aoki | 395/156 |
| 5,041,992 | 8/1991 | Cunningham et al. | 364/518 |
| 5,247,651 | 9/1993 | Clarisse | 395/500 |

FOREIGN PATENT DOCUMENTS

| | | |
|---|---|---|
| 0242131 | 10/1987 | European Pat. Off. . |
| 0295760 | 12/1988 | European Pat. Off. . |
| 0315002 | 5/1989 | European Pat. Off. . |
| 0364189 | 4/1990 | European Pat. Off. . |
| 2022355 | 12/1979 | United Kingdom . |

OTHER PUBLICATIONS

Hirakawa, M., S. Iwata, Y. Tahara, M. Tanaka, and T. Ichikawa, "A Framework for Construction of Icon Systems" Hiroshima University Information Systems, pp. 70–77 [1988 IEEE Workshop On Visual Languages, Oct. 1988].

Tanimoto, Steven L. "VIVA: A Visual Language For Image Processing" *J. Visual Languages and Computing*, vol. 1, pp. 127–139 (1990).

Dyer, D.S. "A Dataflow Toolkit For Visualization" *IEEE Computer Graphics & Applications*, pp. 60–69 (Jul. 1990).

Hirakawa, M., S. Iwata, I. Yoshimoto, M. Tanaka and T. Ichikawa, "HI–Visual Iconic Programming" Hiroshima University Information Systems Lab, pp. 305–314. (no date).

Haarslev, V. and R. Moeller, "Visualization of Experimental Systems" *IEEE*, pp. 175–182 (1983).

"Easy Image Processing" by D. Lau-Kee, Computer Systems, vol. 9, No. 8, Aug. 1989, Bromley, GB, pp. 33–34.

"Building Block Shaders", G. Abram, et al., Computer Graphics, vol. 24, No. 24, Aug. 1990, pp. 283–288.

*Primary Examiner*—Leo Boudreau
*Assistant Examiner*—Christopher S. Kelley
*Attorney, Agent, or Firm*—Fitzpatrick, Cella, Harper & Scinto

[57] ABSTRACT

Apparatus for image processing which consists of a display (1) and controller (2), a CPU (3) connected to accept user instructions from a mouse (4), an image processor (5) arranged to process image data and a memory (6) for storing image (and other data). A user can specify a sequence of image processing operations on the display (1) using the mouse (4), and interactively modify the sequence depending on the displayed image. The apparatus operates three independent routines ("virtual machines"); a user interface routine accepting instructions and updating the screen display; a sequence evaluation routine constructing a table (20) representing the sequence graph, and evaluating the table (20) to generate corresponding image processing instructions for the image processor (5); and the image processing routine executing specified image processing operations and storing the result in the memory (6) to be accessed for display. Evaluation only occurs after an output is required.

20 Claims, 23 Drawing Sheets

FIG.5

| | DISPLAYED: | OP | PRECURSOR TO INPUT 1 | PRECURSOR TO INPUT 2 | | SUCCESSOR 1 TO OUTPUT 1 | SUCCESSOR 2 TO OUTPUT 1 | | OUTPUT 1 DATA |
|---|---|---|---|---|---|---|---|---|---|
| REC. 1 | 12a | C | 3 | 4 | | 1 | K | | |
| REC. 2 | 12b | S | 1 | 3 | | | | | |
| REC. 3 | 12c | i | FF | FF | | 1 | 2 | | (GANTEI) |
| REC. 4 | 12d | i | FF | FF | | 1 | | | (2) |
| | | | | SEQUENCE TABLE | | | | | |
| REC. K | 12f | V | 1 | FF | | FF | FF | | |

—20

| | ADDRESS IN TABLE 20 | OUTPUT |
|---|---|---|
| REC.1 | K | |
| REC.2 | | |

OUTPUT TABLE —21

| | ADDRESS IN TABLE 20 | OUTPUT PORT NUMBER | REQUEST NUMBER |
|---|---|---|---|
| REC.1 | 1 | 1 | 1 |
| REC.2 | 0 | 0 | 0 |

PROCESSING REQUEST TABLE —22

FIG.12

| ICON TYPE | # INPUT PORTS | # OUTPUT PORTS | IN.P.1 TYPE | IN.P.2 TYPE | | OUT.P 1 TYPE | | TEXTFILE NAME | COMPOSITE LIST OF STAGES |
|---|---|---|---|---|---|---|---|---|---|
| REC.1 CLOSE | 2 | 1 | IMAGE | SCALAR | | IMAGE | | | |
| REC.2 | | | | | | | | | |

PROTOTYPE TABLE —23

| PROTOTYPE RECORD (ICONTYPE) | INP.1 PRECURSOR | INP.2 PRECURSOR | | OUTP.1 SUCCESSOR 2 | | OUTP.1 DATA | | |
|---|---|---|---|---|---|---|---|---|
| REC.1 | | | | | | | | |
| REC.2 | | | | | | | | |

WORKSPACE TABLE —24

IMAGE PROCESSING

This application is a continuation of application Ser. No. 07/577,004 filed Sep. 4, 1990, now abandoned.

FIELD OF THE INVENTION

This invention relates to apparatus for, and a method of, image processing.

In very many applications (among them meteorology and biological imaging) real world image data is captured as a digital image for subsequent display, and it is very often desirable to provide digital image processing to remove noise, or to increase the contrast between one portion of the image and another. Many techniques exist for various processing operations, such as edge sharpening, median filtering, thresholding and so on, but there is often a correlation between the image content (for example the noise level or the texture of objects present) and parameters of the digital processing to be applied (for example the threshold level, or parameters of the noise filter), so no single processing technique is universally suitable, and it is not in general apparent from an image which type of processing will be appropriate to produce a perceptually significant result. Nor is it in general easy for a user of an image processing system to combine different types of processing operations into a sequence, or to alter such a sequence, since each processing operation is generally performed by a sub-routine computer program and considerable programming skill is required to link such sub-routine into a sequence.

BACKGROUND ART

It is known to provide an image processing system in which a user can instruct the performance of an image processing operation on image data by selecting a corresponding operation icon on a display, and can combine these operations into a sequence (Hirakawa et al, Iwata, S; Tahara; Tahara, Y; Tanaka, M; Ichikawa, T "A framework for construction of Icon Systems", Proc. 1988 IEEE Workshop on Visual Languages pages 70 to 77). In this known system, two sequence assembly methods are provided; a "bottom up" method, in which a user proceeds to assemble a sequence in a linear fashion, each operation being executed before the next can be added to the sequence, and a "top down" method in which dummy data entries can be used to construct a sequence of operations for subsequent execution. Problems with the first of these methods are that because interpretation and execution take place during the sequence construction, the execution (and hence user response) is slow, and that the sequence must have been pre-written in advance, in full detail, by the user (which removes much of the interactiveness or the system). The second method purports to overcome these problems, but is in fact also not interactive since a sequence is specified in isolation from its execution, without a user viewing the effects of the sequence.

A similar "visually programmable" image analysis system is shown in V. Haarslev and R. Moller, "Visualisation of Experimental Systems" Proc. 1988 IEEE Workshop on Visual Languages pages 175 to 182.

OBJECTS OF THE INVENTION

An object of the invention is to provide a method of, and apparatus for, image processing which allows a user to select, combine and modify processes relatively simply, without needing a detailed understanding of computer programming.

Preferably, he can view the results of intermediate processes in the sequence and thereby interactively modify the sequence.

Since images are represented by large volumes of data, (for example, 6K×6K arrays of picture elements are not unusual) image processing and transfer can be slow. A further object is thus to provide such a method and apparatus in a manner which is economical of image processing resources, and/or of image data transfer.

SUMMARY OF THE INVENTION

Broadly speaking, the invention provides a system of specifying related image processing operation with visual feedback to the user. The invention also provides a system of this kind in which tasks, for example image processing, are performed only when, and to the extent, necessary.

According to one aspect of the invention there is provided an image processor in which a user can assemble a sequence of image processing operations by visual programming (i.e. manipulating objects on a display screen); in which image processing is not performed until a demand for it arises (for example, a user instruction to generate a screen output).

This has the advantages of an interactive system, in which, however, unnecessary image processing operations (performed, for example, whilst a user is modifying the sequence and hence being irrelevant) are avoided and so load on the image processor is reduced, which allows a more rapid response to user actions.

According to another aspect of the invention, there is provided an image processing system for specifying related image processing operations with visual feedback to the user and allowing recursive operations to be specified. This enables complex operations to simply specified.

In another aspect, the invention provides a visually programmed image processor in which the displayed output images may be manipulated without rewriting the image data. This gives a user greater visual feedback on the effects of the processing.

In a further aspect, the invention provides a system for specifying a plurality of interrelated image processing operations, with visual feedback, in which the syntax of connections between operations is checked for validity.

In a further aspect, the invention provides a visually programmed image processing system in which equivalent functions which operate on different types of data are given a common graphical representation. This greatly improves the quality of the visual feedback to the user.

It will be recognised that many aspects of the visual feedback provided by the invention are independent of the particular way in which the sequence of image processing operations are evaluated, specified and performed.

However, in a further aspect of the invention it is particularly advantageous to separate the processes of giving visual feedback to the user from those of evaluating, specifying and performing the image processing operations. Particularly preferred is a system in which these "user interface" tasks, the processing evaluation/specification tasks, and the image processing operation are each performed separately of the other.

It will be apparent that in systems of these types, each task could be performed at a physically separate device, the devices being connected by telecommunication links. Accordingly, the invention extends to novel terminal devices for use in such a system. The invention extends equally to corresponding methods of image processing.

Other inventive aspects and features of the invention will be apparent from the following description, as will advantages of these aspects of the invention.

BRIEF DESCRIPTION OF THE DRAWINGS

The invention will now be illustrated, by way of example only, with reference to the following drawings in which;

FIG. 5 shows schematically the contents of tables within the embodiment;

FIG. 12 shows schematically the contents of tables maintained by the user interface routine of FIG. 3;

DETAILED DESCRIPTION OF PREFERRED EMBODIMENTS

Figure 1:
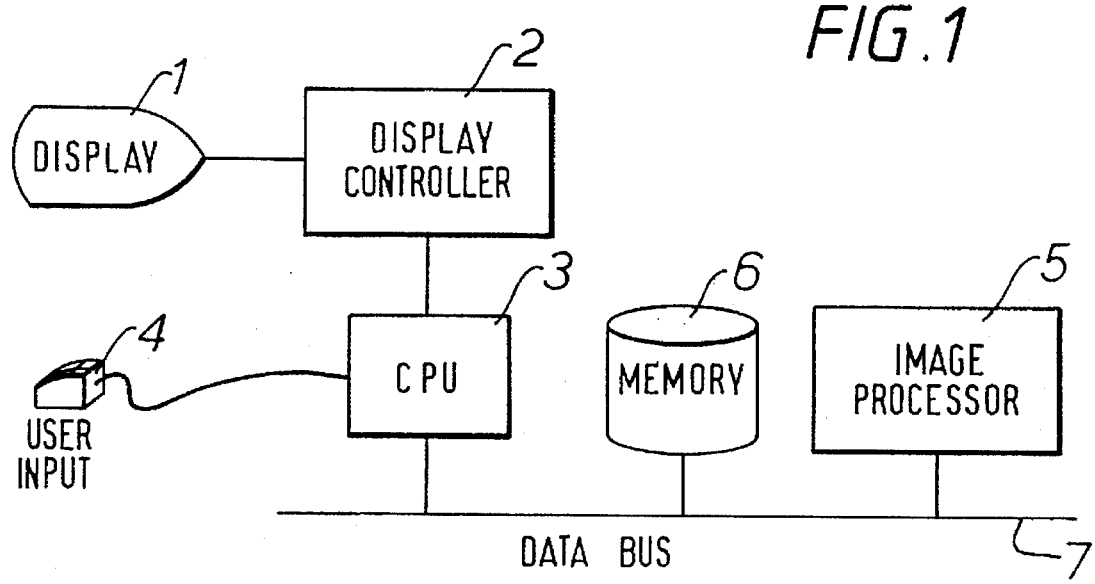
FIG. 1 shows schematically one form of apparatus according to the invention.

Referring to FIG. 1, in one embodiment, apparatus according to the invention comprises a display unit 1 (typically a colour CRT VDU capable of high resolution graphics displays), controlled by a display controller unit 2 of conventional kind (such as the Sun Microsystems GX Controller for the CG6 Frame Buffer) which generally includes frame buffers for storing alternative screens or windows.

Coupled to the display controller is a central processing unit (CPU) 3 (such as one of the widely available 16 bit or 32 bit microprocessors currently available) together with its associated program memory. The CPU 3 is connected to supply to the display controller unit 2 data indicating the content and the mode of the display to be produced on display unit 1. Coupled to the CPU 3 via some suitable input (not shown) is a user input device 4 allowing a user of the apparatus to issue image processing instructions to the apparatus. In preferred embodiments the user input device is of a type which allows visual feedback on the display of the user indications, and is typically a "mouse" device allowing a user to position a pointer or cursor at an option on the screen and indicate his selection of that option (other suitable devices include light pens, touch sensitive screens, and so forth). It is sometimes preferable to provide a dedicated image processor unit 5 capable of receiving input image data (for example, an array of 1024×1024 pixels each comprising an 8-bit luminance value, or possibly 3 colour values), and performing an image processing operation (for example, an edge enhancement operation) to provide corresponding processed image data as an output (typically in the same format as the input data). A suitable processing device is the NEXUS 6180 (available from NEXUS Corp. in Japan). Such a device is programmable to execute desired image processing sub-routines; the programming language is preferably C++, a variant of the C language, but, of course, any suitable language may be used. The device therefore requires an associated program memory for storing such sub-routines, each sub-routine from the repertoire being accessed by a suitable call. As in all image processing applications, read/write data memory is required for storing unprocessed image data, intermediate calculation results and processed image data; this is indicated schematically as 6 and may take any suitable form. The elements of the apparatus are interconnected by a data bus, indicated as 7, and associated address lines (not shown).

Conveniently, the above apparatus may comprise a suitably programmed engineering work station (EWS), for example the Sun 3/260 C available from Sun Micro Corp. of Japan, together with the image processing hardware indicated above. Such a work station typically operates in a multi-user environment; that is to say, multiple programs can share the computing resources and appear to the user to be running simultaneously, passing data between each other as necessary. Typical of such environments are the UNIX system originally developed by AT&T and its variants.

SYSTEM FACILITIES

Figure 2:
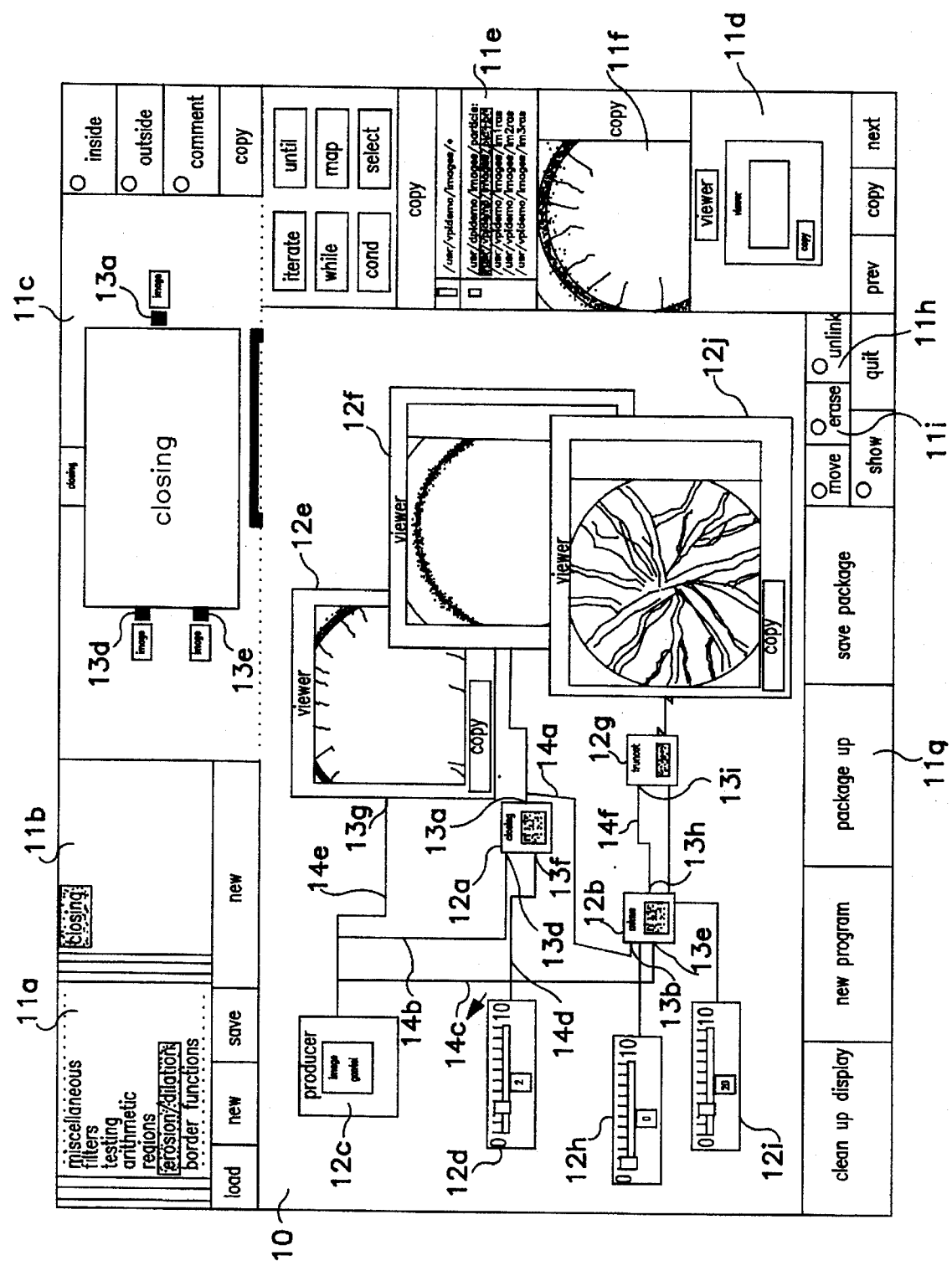
FIG. 2 illustrates an example of a screen display produced by one type of apparatus according to the invention.

Referring to FIG. 2, the operation of the apparatus of FIG. 1 as it appears to a user will now be described.

Display controller 2 produces on display 1 a "tiled" window display comprising a central work space area 10 and, surrounding it, support areas (or "panes") 11a, 11b, 11c, 11d etc. which, in conjunction with the user input device 4, allow the user access to supporting functions such as disc or library access, as well as permitting him to combine image processing operations. To commence the constructions of a sequence of operations, the user may use his mouse 4 to select a class of operations of a particular kind (for example, erosion or dilation operations in which regions of an image bounded by edges are contracted or expanded). The CPU 3 ascertains the position of the cursor, accesses the memory 6 and displays the corresponding list of processing operations available in the class selected on the display 1. The user then uses his mouse 4 to select a desired operation (in this case "closing"—an operation in which high spatial frequency dark areas of the image of less than a given scalar width are eroded and filled in with luminance, and/or colour pixel values from the surrounding regions).

At this point the user may, if he wishes, instruct the apparatus to display information on the function he has selected, by using his mouse 4 to position the cursor in an information display area 11c. He may select, as shown in FIG. 2, an outside view of the function which indicates the data types required as input and produced as output by the operation (in this case, image data is required as input and produced as output, and a scalar input indicating the width of areas to be closed is also required).

By positioning the cursor on other regions of the area 11c (shown as graphical representations of buttons in FIG. 2), the user may instruct the CPU 3 to display (or, alternatively, to recite via a text-to-speech convertor and speech synthesizer such as those supplied by Texas Instruments) a textual comment describing the operation of the function (held in memory 6). Alternatively, he may instruct the display of an inside view of the function, as will be discussed below.

By appropriately positioning the cursor over a designated area of area 11c (shown as the area "copy" in FIG. 2) the user instructs the CPU 3 that he wishes to select the operation illustrated in area 11c, and a corresponding graphical representation, or "icon", 12a is generated by the CPU 3 and the display controller 2. The display controller 2 repeatedly up-dates the position of the icon 12a to track the position of the cursor controlled by the user input device 4, so that the user may position the icon 12a at any point on the screen.

At this point, the user may proceed to add further image processing operations either upstream or down-stream of the closing operation indicated by icon 12a. Let us assume that he wishes to subtract the original image from the image as processed by the closing operation, so as to enhance the small areas which have been closed and reduce the brightness of the background. By positioning his cursor within area 11a and selecting the "arithmetic" operation library, and then selecting a "minus" operation (which subtracts from each pixel of a first image, the luminance value of the corresponding pixel of a second image, to provide a difference image as output) using areas 11b and 11c and user input device 4 in the manner described above, he instructs the CPU and display controller 2 to generate a further icon 12b representing this operation.

He then positions the icon 12b at a suitable point within the work space 10 using the user input device 4, and instructs the CPU 3 to indicate a linkage between the two functions as follows. Using user input device 4, he positions the cursor near the output port 13a of the closing operation icon 12a. The CPU 3 responds by providing a graphical representation of a link 14a, connecting the cursor with the output port 13a. The graphical representation of the link 14a indicates visually what the nature of the data flow indicated by the link 14a is; for example, in this case, the output of the closing function is image data and this is indicated by displaying the link 14a as a thick line. By moving the cursor, the user can extend the link 14a since the display controller 2 updates the representation of the link 14a to keep one end at the cursor position. The user then moves the cursor to an input port 13b of the icon 12b representing the subtraction operation. The CPU 3 indicates that the two operations have been linked to specify a sequence, by connecting the cursor end of the link 14 to the input port 13b of the icon 12b, and instructing the display controller 2 to cease up-dating the link position in response to motion of the user input device 4.

In order to keep the size of the library of image processing functions small, so as to avoid confusing a user, without losing valuable operations from the repertoire of processes, it is very desirable that certain functions be defined flexibly. For example, the subtract operation indicated by the icon 12b could in context represent one of three different operations; firstly, as here, a matrix subtraction in which each pixel of one image is subtracted from the corresponding pixel of another to yield an image output; secondly, when one input port is connected to a source of image data and the second to a source of scalar data, the matrix operation of subtracting the scalar data value from the luminance value of each pixel of the image to provide an image output; thirdly, when both input ports are connected to sources of scalar data, the scalar operation of subtracting one scalar value from another to yield the scalar output. In other words, operations which are analogous, but operate upon data in different formats, are represented by a common graphical symbol.

Should the user attempt instead to incorrectly connect a link between a port (e.g. 13a) which requires an array of image data as input or output with one (e.g. 13f) which requires a different data type (e.g. a scalar number, CPU 3 would signal a syntax error—typically by causing the link to flash on and off or by not allowing it to be connected.

Further, an error would be signalled should a user attempt to connect an input port to more than one output port, since this would violate the determinism of the sequence.

At this point, the user may find it convenient to specify an input node since the same image is to be supplied as an input for both the closing operation represented by icon 12a and the subtraction operation represented by icon 12b. Accordingly, by positioning the cursor within area 11d, and specifically within the areas designated "prev" and "next", the user instructs the CPU to display a sequence of icons representing process stages other than image processing operations (for example input and output stages). Upon reaching the desired stage, the user selects that stage by positioning his cursor on the "copy" region of area 11d and, as before, CPU 3 responds by instructing display controller 2 to generate an icon 12c representing the input stage. As before, the user uses his user input device 4 to position the icon 12c, and then to provide links 14b, 14c from the port of the icon 12c representing the input node to the input ports 13d, 13e of the operation icons 12a and 12b respectively.

The "closing" operation represented by icon 12a also requires the specification of a scalar parameter specifying the width of areas to be closed. For this purpose, the user positions his cursor in area 11d as before and steps through the available stages to reach a scalar input stage, graphically represented by icon 12d as a slider bar control. He positions the icon 12d as before, and specifies a link to the input port 13c of the "closing" icon 12a. As a scalar input node has been connected to a scalar input port, the link 14d is represented graphically using a narrow line, to indicate that the data flow represented by the link is of scalar data.

At this point it may be convenient for the user to specify a particular input image to be processed; either because he wishes to process that image, or for use in verifying the effect of the sequence he has created for subsequent processing of a different image. To do so, he uses input device 4 to position the cursor within the area 11e. Within this area, a list of available images held on disc, and/or image sources such as external input device (e.g. cameras) is displayed, and a particular image may be selected by positioning the cursor on the textual indicator of that image (in this case, /usr/vpldemo/images/gantei). A low resolution display 11f of the image indicated by the cursor position is produced by CPU 3 and display controller 2, so that the user may browse through a list of images and select an appropriate image by its appearance. Once the user has signalled his selection of input image to the CPU 3, an indication that this image forms the input is provided—either, as shown, by inserting a textual reference to the image within the input node 12c or by allowing the user to move an icon representing the image into the input node icon 12c, by moving the cursor. This latter method is preferred, since it is both clearer to the user and produces greater user involvement. This browsing facility is found greatly to enhance the user's freedom to experiment, and is a preferred method for inputting user instructions. Preferably not only images for input, but also image processing operations and other sequence stages are proffered to the user in a list through which he may browse together with a visual/graphical description, or indication of the effects of each choice.

At this point, the user may wish the view the effects of the sequence of processing operations he has specified, and also to assess the effects of the stages separately by viewing the image produced at intermediate stages of the sequence. To achieve this, he positions his cursor within area 11d using the user input device 4, and selects an output operation. In this case, the output operation instructs the apparatus to display a picture of the image within an inset area of the workspace 10. This output operation is displayed as an icon 12b labelled "viewer", surrounding the display area. The user connects the port 13g of the viewer icon 12e to the port of the input node 12c, as previously. When the connection is made, a picture of the image is generated within the viewer icon 12e.

The user may then similarly connect a second viewer icon 12f to the output port 13a of the "closing" icon 12a. After doing so, a view of the input image after closing of areas is displayed within the icon 12f.

To adjust the closing operation so as to fill all, but only, those areas which are of interest, the user may position his cursor upon the area of the icon 12d representing the slider, to which the CPU 3 responds by instructing the display controller 2 to update the slider position to track the cursor motion. When the slider is moved thereby to a new position, the picture displayed within icon 12f changes to reflect the change in the processing specified by the user. In this manner, the user may by trial and error arrive at a suitable scalar input for the closing operation.

At this point, the user may add a further operation to the sequence. In the manner described above, the user selects the "truncate" operation, which constrains the range of luminance pixel values of the image to lie between first and second scalar limits, and positions the corresponding "truncate" icon 12g within the work space 10. The output port 13h of the icon 12b representing the subtraction operation is connected to the input port 13i of the icon 12g representing the truncation operation by a link 14f, as before, and two scalar inputs are provided by further slider bar icons 12h, 12i connected via links to the scalar inputs of the truncate icon 12g. A viewer icon 12j is connected to the output port of the truncate icon 12g, and a picture of the image produced by subtracting the images shown in the icons 12f and 12e and then truncating their range to lie between the scalar values indicated upon the slider icons 12h and 12i is displayed within the icon 12j. The scalar values indicated by the slider bar icons 12h and 12i, which define the upper and lower values between which the luminance of the pixels of the image displayed within 12j are constrained to lie, may as before be adjusted by the user to provide a visually enhanced image.

At this point, the user could cause the processed image displayed at 12j to be output (e.g. to a printer or to a high resolution monitor, or to a disc store) by selecting an appropriate output stage as before, and connecting it to the output port of the truncate icon 12g.

Preferably, the user is also able to instruct the display controller 2 to directly amend the appearance or elements of the display in the work area 10 without changing their significance within the image processing sequence; it is preferred that the user should be able to enlarge, zoom or move the portion of the image shown as output (e.g. in a viewer icon), and preferably to combine zooming in and moving the center of the image. Similarly it is useful to be able to reposition (as opposed to reconnecting) icons.

An image can be manually transferred between stages of sequence, for example, between output icon 12f and input icon 12c, if a user so desires, by positioning the cursor over the display in the output icon, in response to which the CPU 3 instructs the display controller 2 to move the image with the cursor to the point desired by the user. When the image is positioned in the input stage icon 12c, the images displayed at 12e, 12f and 12j are changed to reflect the new input.

Other options are also open to him. For example, he may save the image processing sequence as a program for later execution on other image data. This preferably is achieved by designating the sequence as a new processing operation, which will then be allocated an icon and may be incorporated as a building block into further sequences. This is achieved by positioning the cursor on area 11g of the display (labelled "package up"), to which the CPU 3 responds by instructing the display controller to track the cursor position as the user uses the user input device 4 to create a box around the icons 12a, 12b, 12d, 12g, 12h, 12i (but not 12c, 12e, 12f, 12j).

Alternatively, he may break one or more of the links 14a–14f by firstly positioning the cursor over the "unlink" area 11h, and then over a port at the point at which the link is to be broken, and then reconnecting the input stage, output stages, and image processing stages in a different manner. Each time a change is completed, any output 12e, 12f, 12j which is connected will exhibit the effects of the change. In a similar manner, he may delete a stage (for example a "viewer" output stage) by breaking all links to that stage, positioning the cursor on the "erase" area 11i, and then on that stage using the user input device 4.

From the foregoing, it is seen that an image processing operation in the library available to the user may itself have been built up of several other such operations. It is in such cases that the option of selecting an internal view of the operations, mentioned above, is of value to the user; upon selecting such a view, there is displayed within area 11c a graphical representation (corresponding to that illustrated within the work area 10) of the sequence of operations of which it is comprised. Such operations may themselves comprise a sequence of others, in which case a user may, by positioning the cursor within the area 11c upon such an operation, obtain a further internal view of that operation and so on.

It is possible for a user to create a recursive operation, by creating a first, "dummy", new operation; creating a further sequence of operations including the dummy within the sequence, and then saving the further sequence as an operation of the same name as the first (which is thereby overwritten); upon being invoked such a sequence will re-invoke itself. It will be apparent that this ability to define recursive operations is only available because the user can define a sequence before executing any operations in the sequence, as otherwise it would not be possible to create such a "dummy" operation.

It should be apparent from the foregoing that the order of user operations given above is purely exemplary. Any of the above user operations could have been chosen at any stage. An advantage of the invention is that the user is not constrained in the order in which he assembles a sequence; he may add operations or input/output stages in sequence order, or in reverse sequence order starting from the end, or any mixture of the two; or he may specify all the stages of the sequence by positioning them in the workspace prior to specifying any links between stages. The term *sequence* should thus be read loosely, as indicating a number of interdependent operations.

SYSTEM DESCRIPTION

Referring to FIG. 3–23 the manner in which the apparatus of FIG. 1 provides the features described above with reference to FIG. 2 will now be explained. The various functions performed by the apparatus may be classified as: user input/output operations (receiving and interpreting user input instructions, modifying the display to provide visual feedback of those instructions—for example, by moving icons to track the cursor, and displaying image outputs); image processing operations (performing matrix mathematics upon specified arrays of image data to yield output image arrays), and interpretative operations (understanding user input instructions, assembling a corresponding sequence of image processing operations, and instructing the performance of those operations).

User Input/Output

The display controller 2 is preferably of the (currently common) type which provides a number of screen windows to be defined concurrently, and has a separately addressable memory area for each, to which the CPU 3 may read or write instructions or data. Preferably also provided are the operations of defining the appearance of screen objects. A number of predetermined objects corresponding to icons for each processing operation or input/output stage are stored within the display controller memory, and may be called up and moved within predetermined screen window by the CPU 3.

The user input device 4 for user instructions is preferably a screen interactive device such as a "mouse" as stated above, but it is generally also desirable that an alphanumeric keyboard input device be provided so that a user may, if necessary, provide alpha-numeric filenames to directly identify image data files. Sub-routines for interrogating a mouse input unit, and providing cursor movement on the display screen as visual feedback to the user are well known tools available as standard routines in languages such as Smalltalk, and will not be further described. Likewise, the operation of determining, from the cursor position, which screen window and which sub-area or "pane" of that window, or other screen object, is selected by the user are conventional and need no further explanation to the skilled man.

Figure 3:
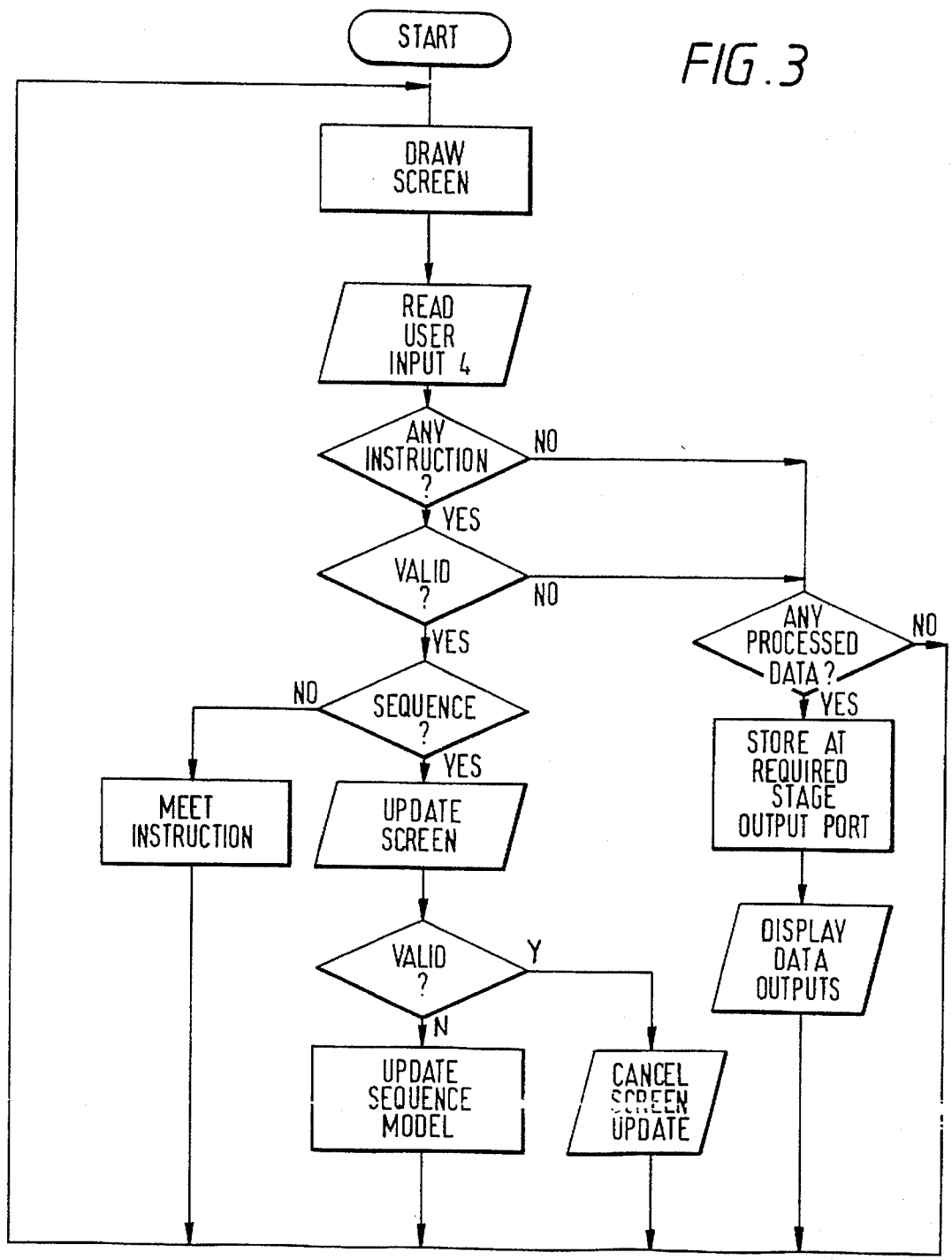
FIG. 3 shows schematically the flow of operation of a user interface routine in this embodiment.

Referring to FIG. 3, upon switching on, or invoking, the image processing apparatus, the CPU 3 instructs the display controller 2 to generate the opening screen display (substantially as shown in FIG. 2, but with work space 10 empty).

The operation of continually reading the position output of the mouse input device 4 and updating the cursor position on screen in response thereto is generally carried out by the display controller 2 and the CPU 3. This operation takes place at all times when the apparatus is in use.

When the user signals a desire to issue an instruction, for example by "clicking" the mouse 4, the CPU 3 interrogates the display controller 2 to ascertain the relevant screen area or screen object (i.e. area) under the cursor, and checks whether the area corresponds to a valid instruction. If not (for example if the cursor is within an empty workspace area 10) the CPU remains inactive (and may additionally signal an error, e.g. by producing an audible bleep output). If the user instruction is apparently valid, the CPU 3 operates to service the instruction by passing program control to an appropriate sub-routine.

The CPU 3 may respond to user inputs in an interrupt—driven fashion, but us preferably, as shown in FIG. 3, arranged to execute a continual polling operation to interrogate the state of the user input device 4.

User instructions may broadly be classified as, firstly, those which involve the assembly of the sequence of image processing operations, and, secondly, those which do not. Examples of the second category are those user instructions signalled by "clicking" the cursor over areas 11a, 11b or 11c, which concern user accesss to information concerning available image processing operations. Selecting a library using area 11a causes the CPU 3 to access memory store 6 (for example a disc drive unit), retrieve a corresponding list of image processing operations, and instruct the display controller 2 to display these within area 11b; corresponding user instructions from areas 11b and 11c cause CPU 3 to access from memory 6 textual or graphic information concerning the function selected, and to instruct the display controller 2 to display the information within area 11c.

If, on the other hand, a user instruction relates to the assembly of the sequence of image processing operations, two actions are necessary; firstly, graphic feedback is provided to the user, and secondly, the user's intention must be understood and implemented. For example, if the user elects to place the "closing" function within his sequence, CPU 3 firstly instructs the display controller 2 to select the appropriate icon 13a from its image memory and move the icon in response to the cursor position to a desired screen location, and secondly amends its internal representation of the sequence to include the "closing" function, this latter operation being invisible to the user, as discussed in greater detail below.

If the user has specified any on-screen image outputs (i.e. if there are any viewer icons on the screen), after each image processing operation is complete, CPU 3 will instruct the display controller 2 to display the processed image generated by the image processor 5.

The user instruction may cause the initiation, rather than completion, of an action, e.g. a link between two icons. In this case, the CPU 3 instructs the display controller 2 to update the graph, by displaying the representation of the link between the selected icon and the cursor position. When the user signals the completion of the link, by moving the cursor over a port of another icon and/or clicking the mouse 4, the CPU 3 performs a checking routine to determine whether the link is meaningful or valid. If the ports of the two icons sought to be connected do not employ the same data type (for example, one generates a scalar output whereas the other requires an image input, the user instruction is regarded as invalid and not executed. The CPU 3 then instructs the image processor 2 to cease to display the representation of the link.

When the CPU 3 is not processing user instructions, it may poll the image processor 5 for output image data to be displayed (e.g. in a viewer icon) in response to a previously instructed processing operation. If such image data available, the CPU 3 identifies the output device or screen area (e.g. viewer icon) for which the image data is intended, and instructs the display controller 2 to display the data accordingly.

Image Processing Operations

Some examples of image processing operations have been given above. There are several libraries of image processing programs currently commercially available in well known programming languages, such as The Spider Library written in FORTRAN, the HIPS Library written in C, the VICAR Library written in FORTRAN, or The TAE Library written in FORTRAN. Although the CPU 3 would generally be capable of being programmed to carry out such image processing operations, it is preferred to provide image processor 5 as a separate, fast, arithmetic device with a suitable instruction set (such as the above mentioned NEXUS device) with an associated program memory storing the library of processing sub-routines. An instruction to such a device generally takes the form of a signal specifying the operation to be performed, identifying the data to be provided as input, and specifying the location of the data produced as output. Typically, input data will be specified by a filename enabling the image processor 5 to access the file from memory 6, and the destination will be either a filename enabling the image processor to store the data in memory 6 filename or at a corresponding address under that; or specifying a particular output device (e.g. a separate high resolution display unit). It is strongly preferred that the image processor 5 should employ floating point arithmetic (according to the IEEE standard 754), so that run—time arithmetic errors such as division by zero, overflow and underflow are reduced, thus reducing the need for error handling routines and reducing the complexity of the processing sub-routines themselves. If, as preferred, the image processor is to operate in parallel with other tasks it is preferably arranged to generate a signal indicating the completion of an image processing operation.

Figure 4:
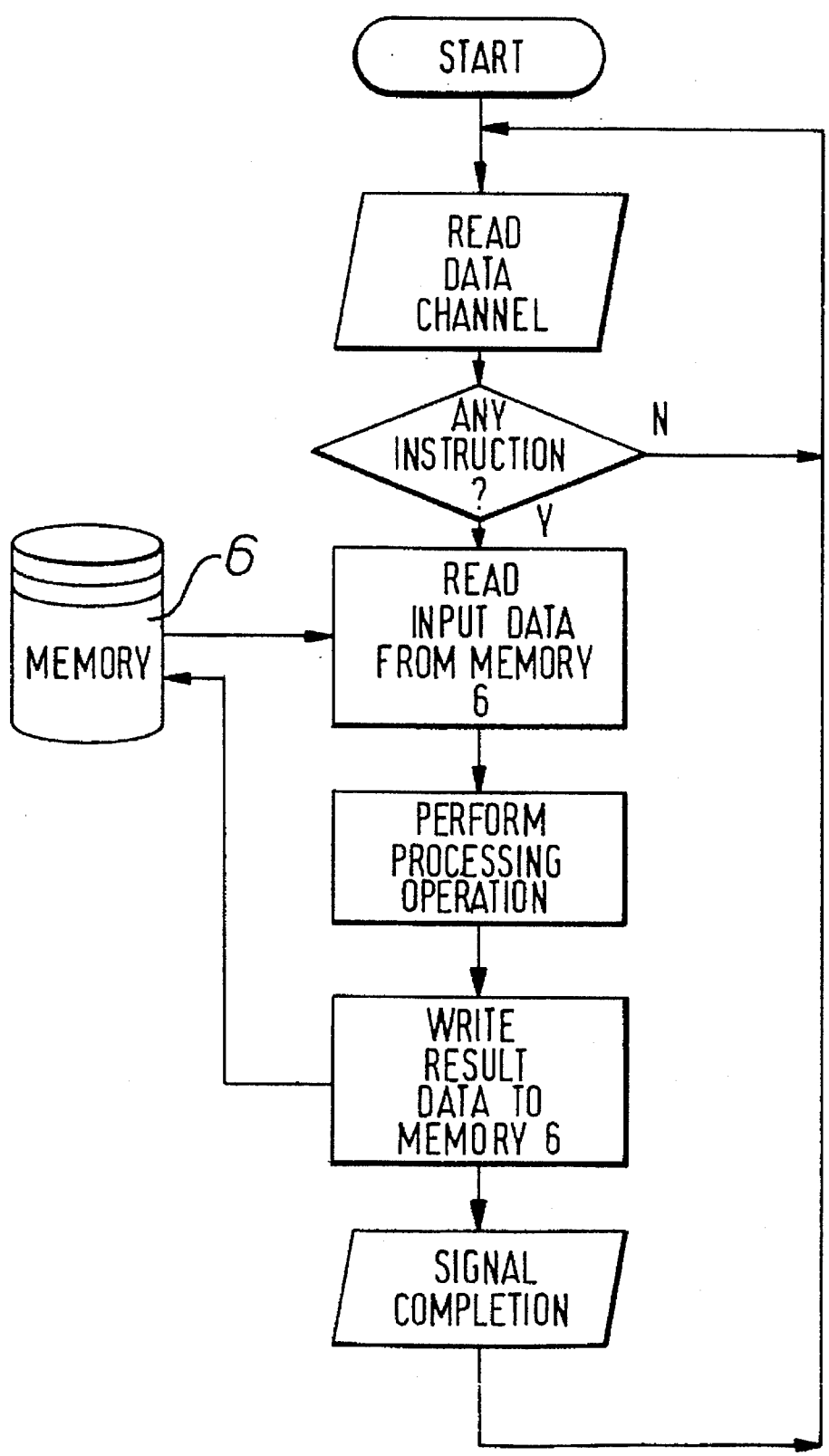
FIG. 4 shows schematically the flow of operation of an image processor device in this embodiment of the invention.

Referring to FIG. 4, the general flow of operation of the image processor 5 is as follows. Upon receiving an instruction signal (comprising an instruction specifying an operation, and specifying the input data for the operation and the destination of the results of the operation) from the CPU 3, the image processor 5 accesses the memory 6 to read the input data, performs the specified processing operation upon the input data, and writes the resulting data back to the memory 6 under the specified output filename. An acknowledgement signal, indicating that the operation is complete, is then preferably sent to the CPU 3.

It may be convenient to allow the image processor 5 to perform other tasks, such as managing the contents of the memory 6; in this case, the image processor 5 may also be capable of accepting instructions to, for example, erase a particular file of data from the memory.

Interpretation

Figure 6:
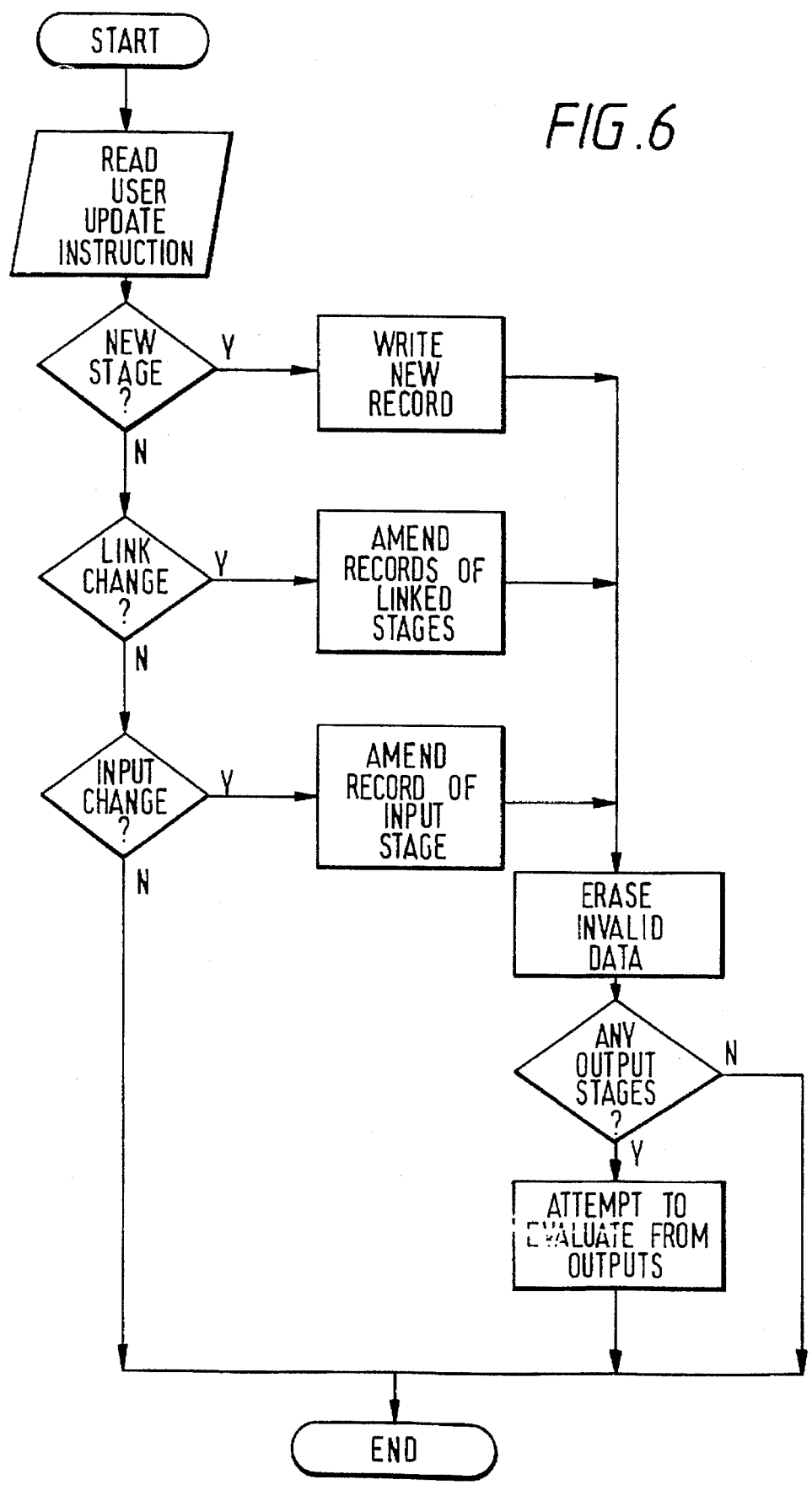
FIG. 6 shows schematically the flow of operation of an evaluation routine in this embodiment.

Referring to FIGS. 5 and 6, the method by which user instructions are interpreted to create the sequence of image processing operations will now be described. A sequence store 20 is provided (conveniently a partitioned area of memory 6) comprising a table of multi-field records. The term "record" should be read loosely, rather than referring to any particular data structure. Referring once more to FIG. 2, and the associated description, when the user brings the icon 12a for the "closing" operation into workspace 10, the apparatus regards this as potentially comprising part of the sequence. Accordingly, the identity of that icon 12a and the type of the operation represented by that icon (indicated by the letter c) are recorded in the first and second fields of the first record of the sequence store 20. Similarly, when the user instructs the entry of the substraction icon 12b within the workspace 10, the corresponding identity, and type indicator (letter s) is written to the first and second fields of the second record of the sequence memory 20. Upon the creation of a link between the output port of the closing icon 12a and the input port of the substraction icon 12b, the CPU 3 accesses the working memory to locate the record numbers of the two icons, and enters in the record of the substraction icon, the details of the stage to which its input is connected. In other words, in the third field of the second record (which relates to the first input port of icon 12b) the number 1 is entered to indicate that this input port is connected to the output port of the operation held as record 1, and in the fifth field of the first record (which relates to the output port of icon 12a) the number 2 is entered to indicate that this output port is connected to the input port of the operation held as record 2.

When the user specifies an input stage 12c, by bringing the relevant icon within the workspace 10, the CPU 3 likewise records the indication of the identity and type of the stage in the first and second fields of the sequence store 20. When the user specifies the link 14b to the first input of the closing icon 12a, the CPU 3 writes the record number 3 associated with the input icon 12c into the third field (representing the first input) of the record associated with the closing operation and the record number 1 into the fifth field (representing an output) of record 3. Likewise, in response to link 14c, the CPU 3 writes the number 3 into the fourth field (representing the second input) of the second record (representing the subtract operation) of the sequence store 20 and the number 2 into the sixth field (also representing the output) of the third record.

In this manner, a representation of the entire contents of the workspace 10, including all the sequences or part sequences which have been assembled therein, is held within the sequence store 20 without any need for the prior performance of any image processing operations.

When an output stage is specified in the workspace 10, additionally an entry is made in an output table 21.

The method by which an assembled sequence is caused to execute will now be explained with reference to FIGS. 5 to 7. Let us suppose that viewer 12f occupies record K of the sequence store 20, and record 1 of the output list. Upon the creation of the link shown to the output port 13a of the closing function icon 12a, the corresponding record number 1 of that operation is witten into the precursor field in the record K of the viewer 12f and the successor field of the record 1 of the closing operation icon 12a. The CPU 3 then attempts to generate the required output to display within the icon 12f.

The CPU 3 inspects the output table 21, and finds an entry (that for the viewer 12f). It selects the entry for the viewer 12f, and reads from the output table the corresponding workspace record number (K). Accordingly, the CPU 3 accesses record K of the sequence. The first field consulted within the record is that indicating the absence or, if present, the identity, of the data held as the output of that stage (or, to be more complete, the output at the output port of that stage—where a stage has several output ports, each will have an associated output data field). In this case, since the icon 12f has not previously been connected, this field holds an indication that no data is available (for example, the code hex ff).

Next, the fields regarding the precursor stage or stages are read. In this case, because the identity of this stage is indicated as an output stage, which has only one input port, only one precursor stage is specified. Because the viewer icon 12f has been linked to the output port of the "closing" icon 12a, the precursor field contains the record number of that stage (1). On the other hand, had this link not been specified—so that the field within record K for the viewer 12f contained the "data not available" flag, the CPU 3 would immediately abandon the attempt to evaluate this part of the graph and would start again with the next output stage (if any) listed in the output table 21.

The CPU 3 then inspects the "data available" fields of the records for each precursor stage (in this case, the record of stage 12a). In this case, since this portion of the graph has not previously been evaluated, data is indicated as unavailable. However, had data from this precursor stage been available, CPU 3 would have evaluated the output of the present stage on the basis of such data (as discussed in greater detail below). When data is available for a stage, and the stage is an output stage, the CPU 3 then selects the next output stage from the output table 21 and proceeds in the same manner.

Where as here, no data is held for at least one precursor stage, the CPU 3 selects the first precursor stage for which no data is held, reads the record for that stage, and proceeds to attempt to evaluate the stage.

Thus, in this case, the only precursor stage referred to in the record K is that stored at record 1 and the CPU reads this record. No output data is held for this stage, since it has not previously been evaluated. All the precursor stages are specified (icons 12c and 12d, records 3 and 4), and by accessing the relevant records the CPU 3 verifies that data is held for each. It is thus possible to evaluate the results of the "closing" processing operation, and evaluation is therefore instructed, by way of an instruction from the CPU 3 to the image processor 4 (as specified below). This stage having been evaluated, and not being an output stage, the CPU 3 then reads the identity of the successor stage from the stage record (in this case the successor stage is record K, the viewer icon 12f), reads the stage record, determines that the precursor stage is specified, determines that data is (now) held for the precursor, and evaluates the data required. In the special case of an output stage, evaluation of the data at that stage does not require an image processing operation since it corresponds identically to the data produced at the output port of the precursor stage, so the data reference of the closing stage (record 1) is simply copied into that of the output stage (record K). The CPU 3 then halts the evaluation loop for that output stage, and checks whether there is a further output stage in the output table; if so, the evaluation process proceeds backwards starting from the next output stage.

Had the successor stage not been an output stage, the CPU 3 would attempt to evaluate the stage and, in the event that data was unavailable for another of its precursors, select that precursor and proceed as above.

From the foregoing, it will be apparent that the evaluation process is in the nature of a recursive tree—following process, proceeding backward until evaluated data is located, then forward to evaluate a following stage, and so on. Other types of graph following technique could alternatively be employed; see for example, D. E. Knuth "The Art of Computer Programming", published by Addison Wesley, 1969.

The data evaluation step described above will now be discussed in greater detail with reference to FIGS. 4 to 8.

In order to invoke the image processor 5, it is necessary to sufficiently identify the process to be performed and the data upon which the process is to operate. In general, image data is too voluminous to be passed between the CPU 3 and the image processor 4, so the data to be processed is identified by a filename or address enabling the image processor 5 to locate the data within the memory 6. Likewise, instead of returning the data representing the result of an operation to the CPU 3, the image processor 5 writes the result into the memory 6 at an address or filename known (or returned) to the CPU 3. Typically (except, as discussed, in the case of an output stage) when a stage is to be evaluated, the CPU 3 has extracted from the precursor stage records the filenames or addresses of the data forming the inputs to the image processing operation, and the identity of the stage (i.e. the operation to be performed by the back end) from the stage record. The CPU 3 then generates a new filename to hold the data resulting from the image processing operation, and sends a signal to the image processor 5 indicating the operation to be performed, and the filenames of the data to be used as input and to be produced as output. The CPU 3 then updates a table of processing requests 22 which comprises a list of those processing operations instructed from the image processor 5 which have not yet been responded to. The table is updated by the addition of a new record which comprises a request number (also sent to the image processor 5 as a header), and an indication of the output port field within the record of the stage to be evaluated by the processing operation.

It will be apparent that the CPU 3 could sit idle and await an indication from the image processor 5 that the data had been returned; in this case, of course, the request table 22 is unnecessary since only one image processing operation would be outstanding at any time. However, in preferred embodiments the delay associated with awaiting the completion of the image processing operation is avoided, as explained below. When the image processor 5 has completed a processing operation and written the corresponding processed image data to the desired file within memory 6, it transmits an acknowledgement signal to the CPU 3, comprising the request number which was previously transmitted by the CPU 3 as header information. Upon receipt of such an acknowledgement signal, the CPU 3 accesses the request table 22. If the request table record to which the acknowledgement is signalled to correspond is set to a "request cancelled" value (for example, zero), this indicates that (as discussed below) the need for the data concerned has been superseded by subsequent user action and no further action is taken. In a preferred embodiment, the available space within the memory 6 is conserved by deleting the unwanted image file.

In other cases, the image data is still required and its destination (record and output port within the sequence table 20) is located by accessing the sequence store 20 at the corresponding record for the stage indicated within the request table 22. The data filename is then written into that port field within the stage record of the sequence table 20.

To reduce the potential delay in displaying the output data, the CPU 3, upon determining the sequence table record for the stage to which the data is to be sent, further determines from the successor fields of the record whether any of its successors is an output stage. If the stage is followed by an output stage, the CPU 3 generates a signal to allow the display of the data. The signal comprises the data filename, together with an indication of the stage, and output port, to which the data corresponds. The request table record is then deleted by overwriting with a zero entry.

The CPU 3 then commences the process shown in FIG. 6; should any output stages be present in the output list 21, an attempt to evaluate the sequence (as shown in FIG. 6) is made.

Figure 9:
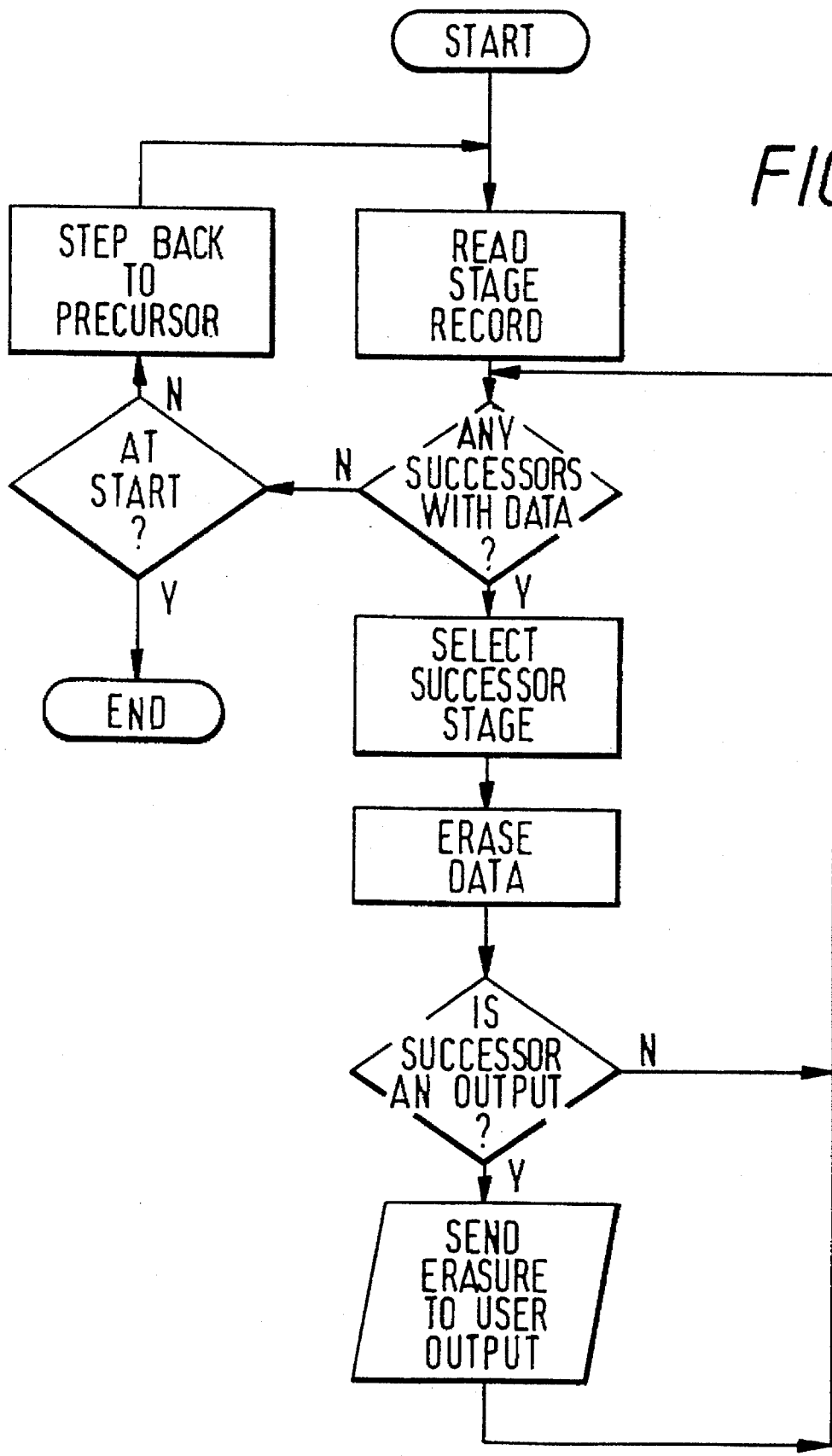
FIG. 9 shows a data erasure sub-routine of the routine of FIG. 6.

Referring to FIG. 9, the process of erasing invalid data performed when a user instruction amends the sequence (for example, by removing a link or by altering the value or identity of input data) will now be described.

In the interests of a simple program structure, the following data erasure procedure is in this embodiment undertaken whenever a user instruction indicates a modification to the sequence, but it will be appreciated that, with a slightly more complex program, the procedure would not be called when a new stage or a new link were added, since neither of these operations has the effect of invalidating the results of processes occuring subsequently in the sequence. On the other hand, a change in the input data or a deletion of a link does invalidate the results of all processes which are successor stages to the link or the input, so all such data must be errased so as not to confuse the user with irrelevant material.

Each user instruction which amends the sequence will have resulted in the amendment of a given record or records relating to the stages concerned. For an instruction which alters the value or identity of input data, the relevant record is that relating to the input stage, whereas for an instruction deleting a link the relevant record (from the point of view of the erasure process) is that relating to the latter of the two linked stages. To execute the erasure process, the CPU 3 reads the record of the relevant stage from the sequence table 20 and determines the record numbers of its successor stages. Each successor stage record is accessed in turn, and if none have an indication of available output data, the erasure process halts. If one or more successor stages has an indication of available data, the first successor stage is selected, its record is read, and its 'indication of data' field is amended to indicate that data is unavailable for that stage.

This process is then repeated, in exactly the same manner, so that the CPU 3 examines the record to locate the successor stages; then examines the successors and selects a new successor stage with available data (which is then erased). In this manner, the CPU 3 moves forward from the amended stage through the sequence, either to an end or to the first point at which data is unavailable.

Upon reaching such a point, the CPU 3 returns to select the record of the precursor stage which it has just previously examined, and attempts to read the record of the next successor stage (if any) with available data. If there is a successor stage with available data, the CPU 3 then proceeds, in the same manner as before, to erase that "branch" of the sequence. Once all "branches" of successor stages have been erased, the CPU 3 again steps further back to the immediate precursor stage and repeats the above erasure process until it has returned to the location at which the user-instructed amendment occured, having thus erased all data at stages subsequent to that stage. The CPU 3 then stops the process. The similarity with the evaluation process described above will be apparent.

At each stage of data erasure, the request table 22 is also reviewed and any table entry referring to a stage for which data has been erased is amended to indicate that the resulting processed data is no longer required from the image processor 5. Additionally, a signal may if desired be transmitted to the image processor 5 to instruct the processor 5 to cease (or to avoid) executing the processing operation, thereby further saving processing time and memory space.

Likewise, a signal indicating that data for each stage has been erased is sent to the user output routine to amend the display (if necessary).

It will be appreciated that the execution of this routine and the evaluation routine both principally involve the operations of memory table access and logical testing, and are hence very easy to implement using well known techniques such as indirect addressing, and are likewise quickly executed on conventional computing devices—evaluating even a complex graph will typically involve far fewer calculations and primitive computing operations that performing an image processing operation.

Figure 7:
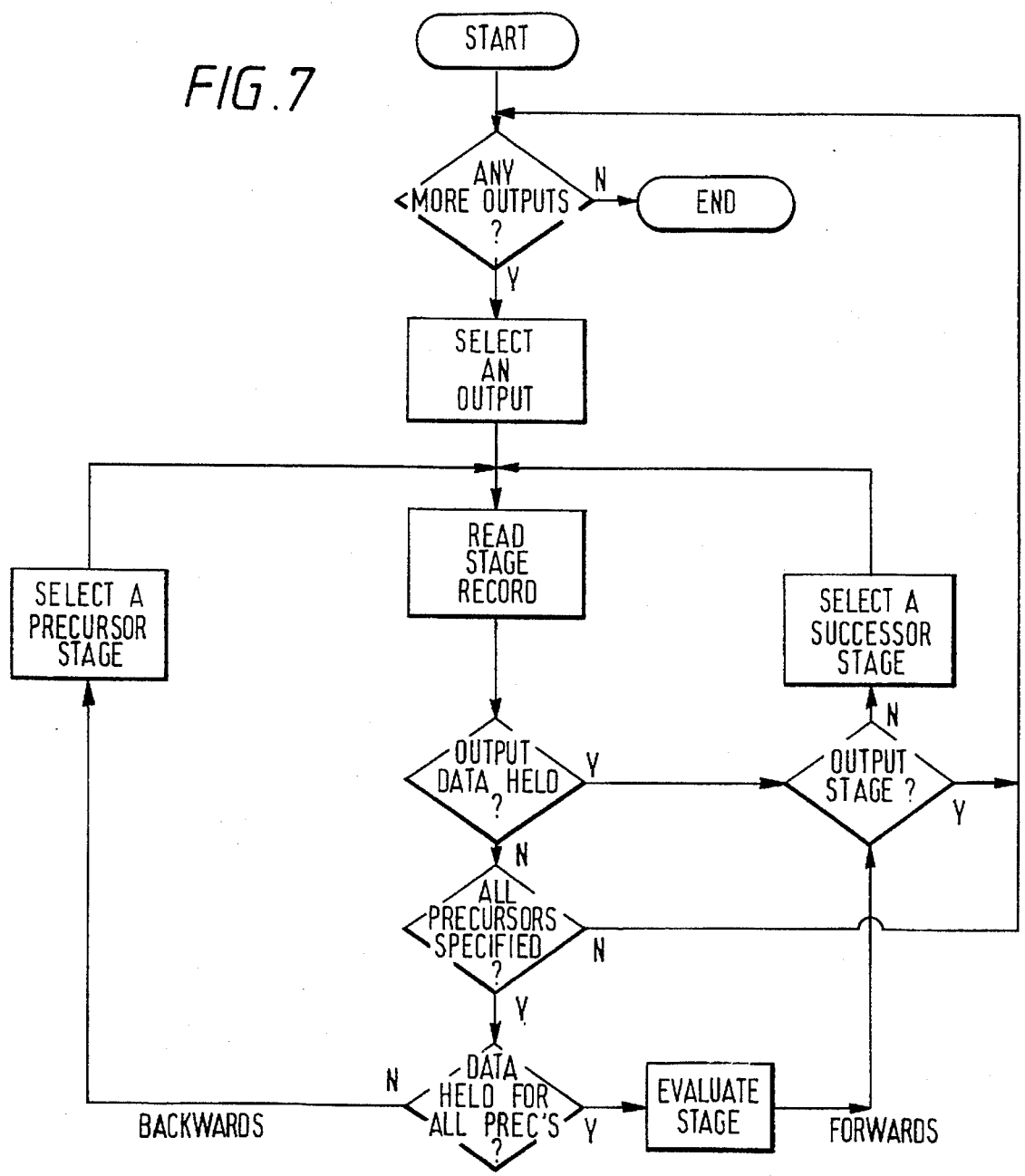
FIG. 7 shows schematically the flow of operation of an evaluation sub-routine of the routine of FIG. 6.

If an output is specified, but it is not possible to construct the sequence fully because the user has not yet specified all necessary links, or has not specified the input data, the CPU 3 may, upon reaching an impasse, abandon the attempt to evaluate the sequence as shown in FIG. 7, or alternatively may step back to a precursor stage and attempt to evaluate a different subsequence. If, during the evaluation process, CPU 3 encounters an operation identifier which indicates that the operation is one which is a composite assembled from other operations, it creates new records corresponding to the constituent operations of that operation, and specifies their links as appropriate, by consulting an operation definition table held in memory 6 for that user defined operation.

Once a sequence has successfully been evaluated, re-evaluation occurs each time a user alters any element of the sequence, or provides any new input data.

Since the process of evaluating the sequence proceeds backwards from its outputs, in principle it would be sufficient to record (as discussed above) in the record for each stage only the addresses of the records of its precursor stages in the sequence, if, instead of instructing the image processor 5 to perform operations during evaluation, the various operations are stacked to form an instruction list corresponding to the sequence.

IMPLEMENTATION

Now that the underlying tasks necessary for the performance of the invention in this embodiment have been described, one preferred arrangement of programmed hardware will be disclosed.

In order to reduce demands on expensive computing time and to increase the speed of the apparatus response to the user, it is desirable to reduce the amount of image processing performed. Accordingly, this embodiment of the invention ensures that the user input tasks which accept user instructions are not interrupted by image processing and sequence evaluation tasks; in this manner, the apparatus can accept a user instruction indicating that the sequence is to be changed, enabling all image processing and evaluation of the sequence to be interrupted until the new sequence is established so that unnessesary results are not calculated. The user input/output tasks are therefore separated from the interpretation/evaluation tasks and image processing tasks.

Because the evaluation process must be performed before the image processor 5 can be instructed, and this process takes place only when an output is specified (or some aspect of the sequence is modified by the user), the demand for image processing operations occurs in bursts separated by quiescent periods. To improve the response speed of the apparatus, it is therefore desirable to separate image processing tasks from interpreting or evaluation tasks, and to prevent the latter waiting upon the outcome of the former, since otherwise if a user changes elements of a sequence whilst the image processor 5 is performing a time-consuming sequence of operations, inappropriate data may be displayed.

To further reduce the delays engendered by the image processor 5, the evaluation tasks are arranged to instruct the image processor 5 to perform image processing operations as soon as the sub-sequence of the sequence which contains those operations has been fully evaluated, rather than waiting for the entire sequence to be evaluated before issuing commands to the image processor 5.

The three types of task could be arranged to execute on a single processing device using a complicated interrupt-driven program, but this is more failure-prone and harder to program.

Figure 10:
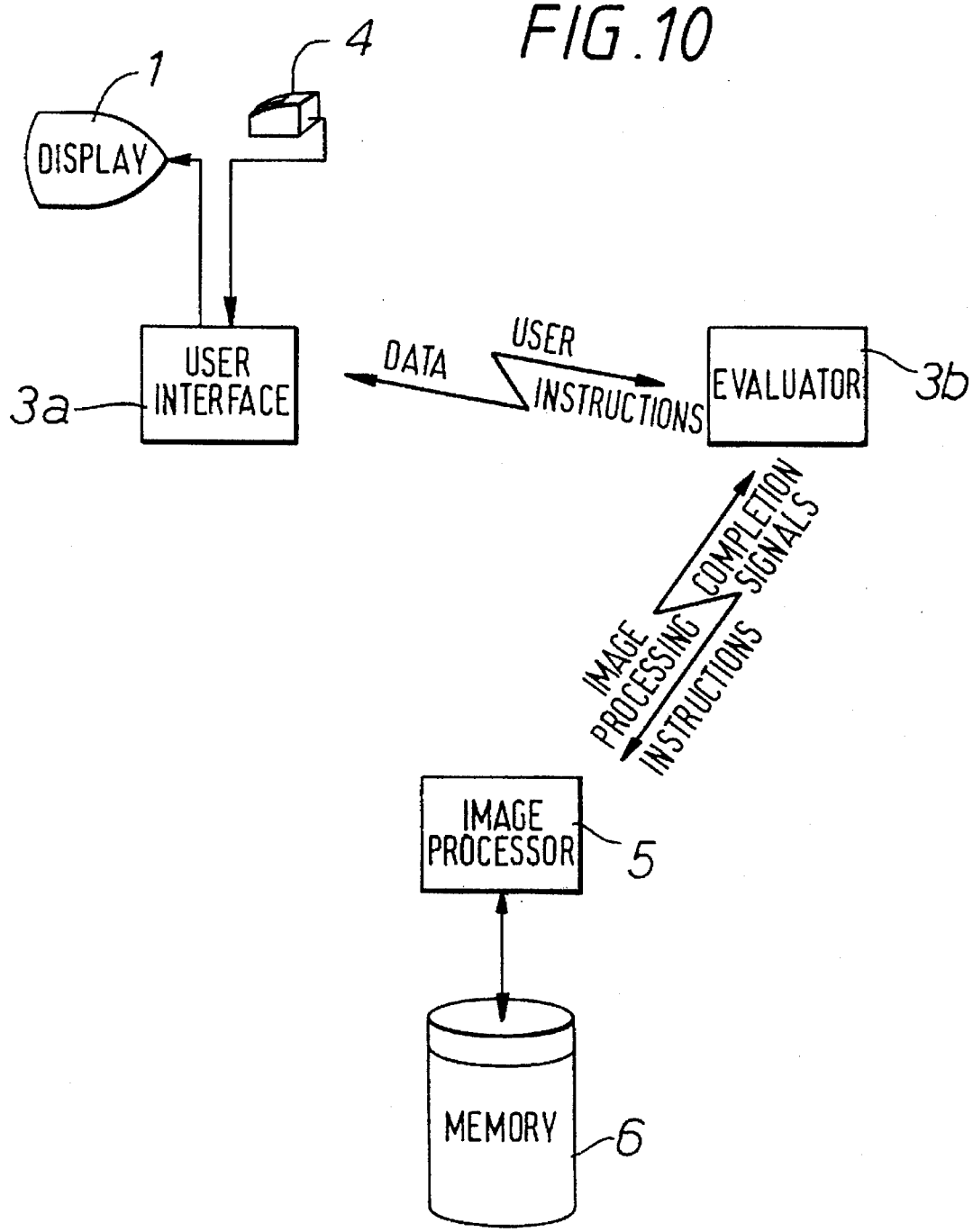
FIG. 10 shows schematically the relationship between the routines illustrated in the preceding Figures.
Figure 11:
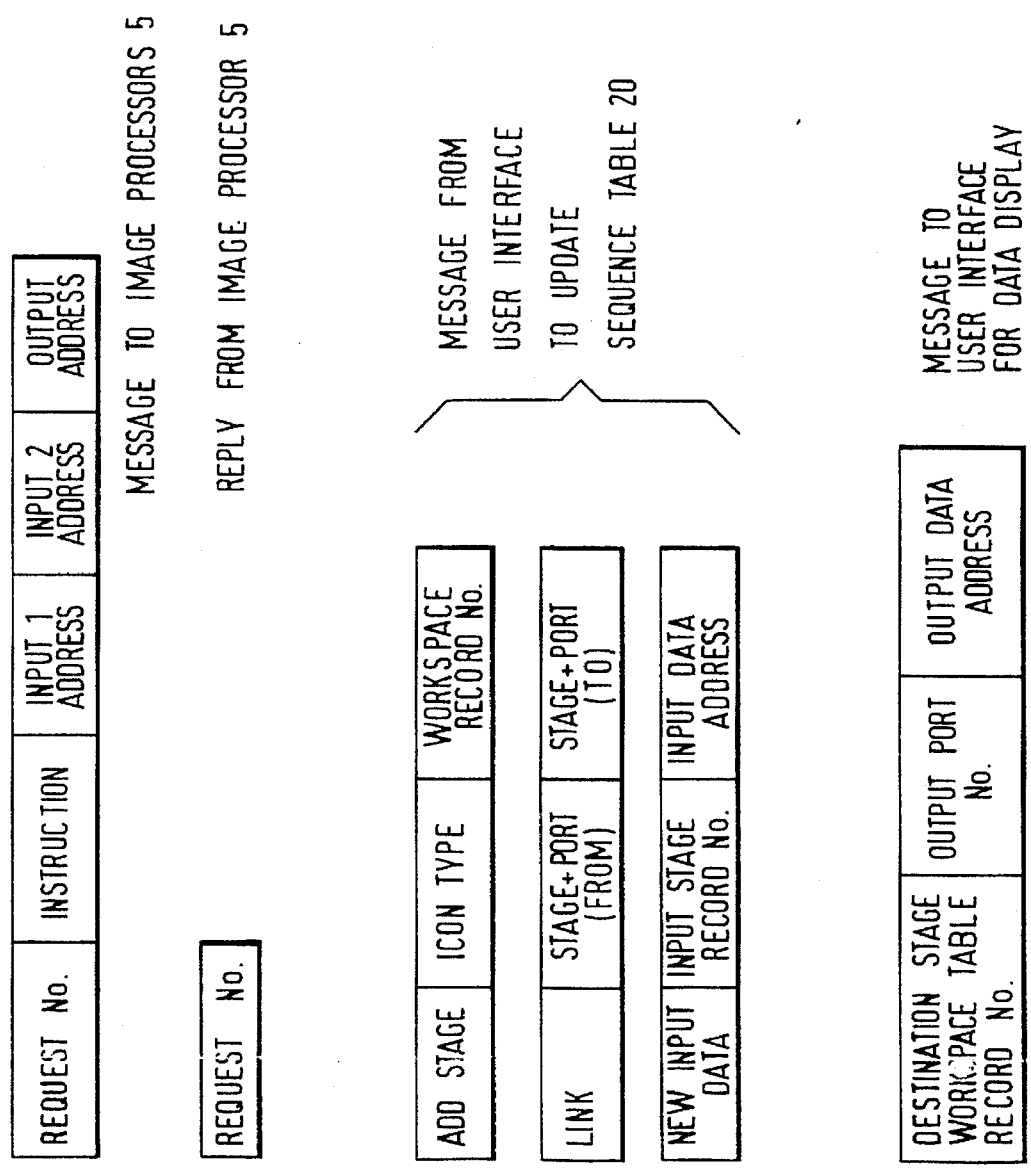
FIG. 11 shows schematically the content of messages passed between the routines illustrated above.
Figure 13:
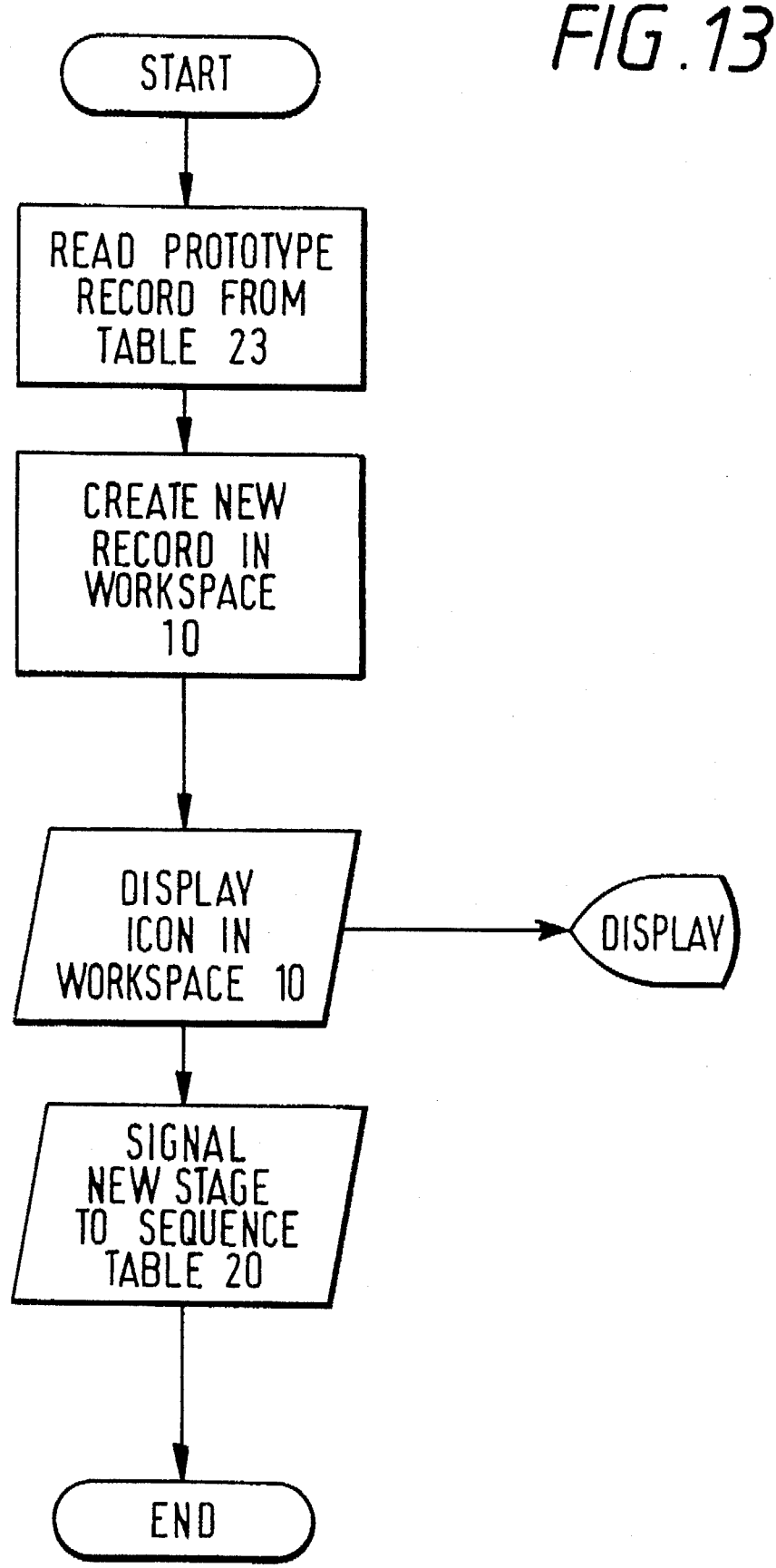
FIG. 13 shows schematically the flow of operation of a sub-routine of the user interface routine of FIG. 3 for creating a new processing stage.
Figure 14:
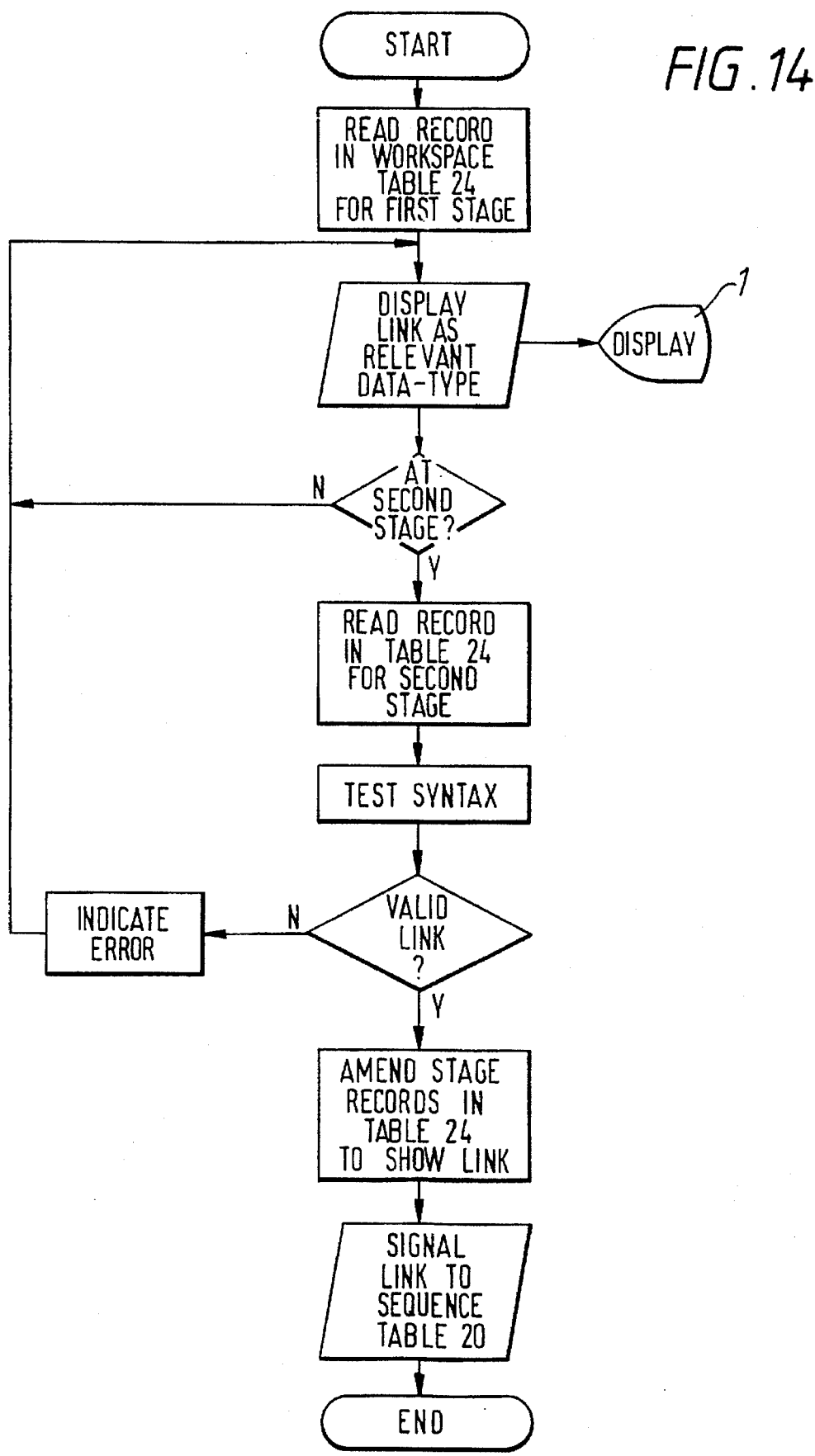
FIG. 14 shows schematically the flow of operation of a sub-routine of the user interface routine of FIG. 3 for creating a new link between stages.
Figure 15:
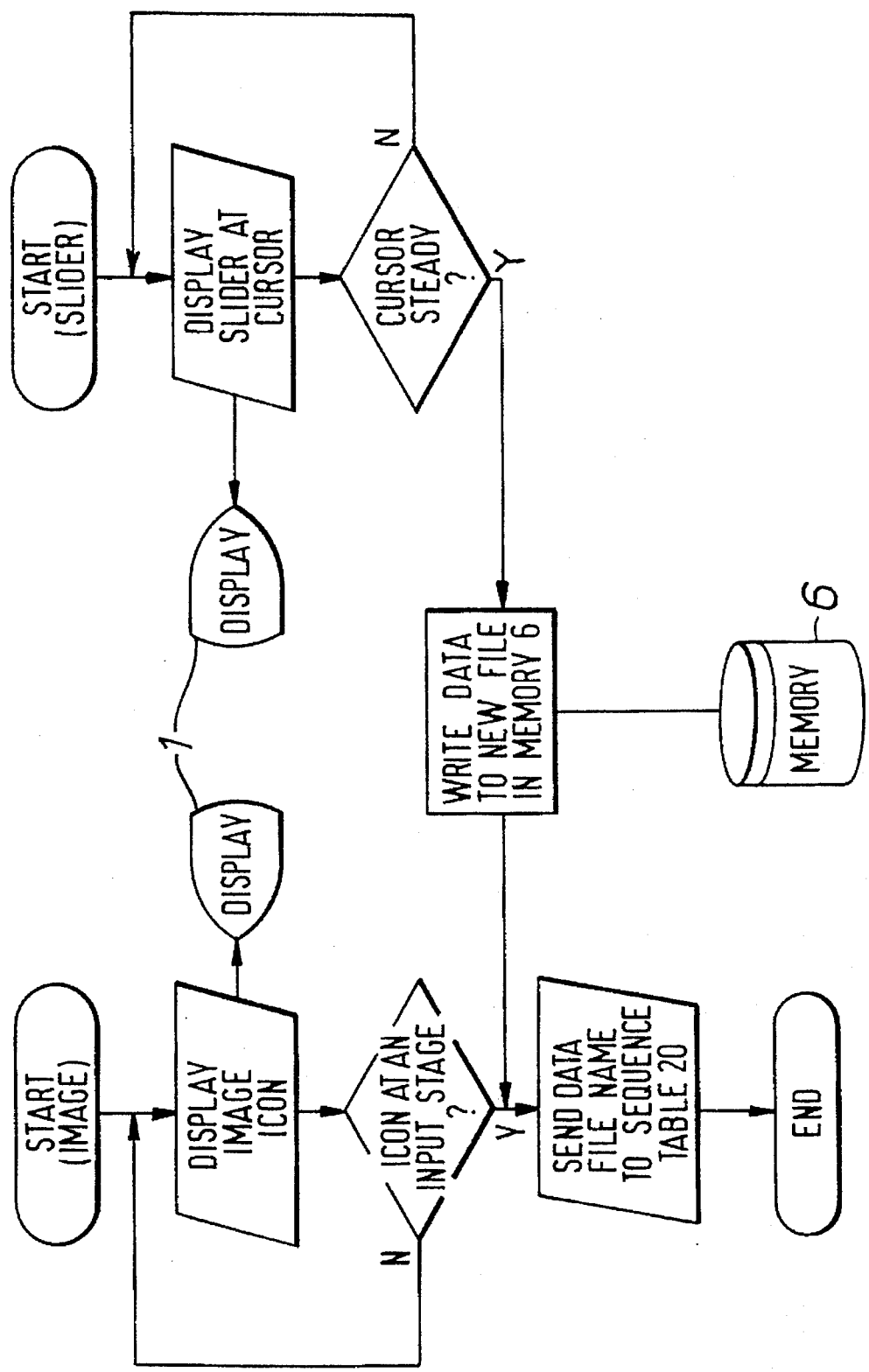
FIG. 15 shows schematically a sub-routine of the routine of FIG. 3 for amending input data to a sequence.

Referring to FIG. 10, these operations are therefore executed as three separate "virtual machines". They could be performed by physically separate programmed processing units communicating data to each other, but it is preferred that, to conform with the features offered by present day work stations, the user input/output (or user interface) tasks and the evaluation tasks are provided as separate program suites 3a, 3b each comprising a continuous loop, running asynchronously in a time-interleaved fashion on a single processing device or CPU 3, with a separate image processor 5 as shown in FIG. 1. Communication between the three sets of tasks is, of necessity, in bursts and so asynchronous communications channels are used via Internet sockets (a term which will be understood to include data transfer within programs operated by a single device as well as physical connection between devices) through the data bus 7. Formats of messages through the channels are indicated in FIG. 11.

A further channel, for error messages, may be provided from the image processor 5 to the evaluation routine; this channel 2 is checked at every cycle of the evaluation routine. In the event of a major failure at the image processor 5 or the memory 6 (for example, a loss of power), an error message is transmitted from the image processor 5 and appropriate action is taken by the CPU 3 (for example, the screen is erased and an error message displayed).

USER INTERFACE ROUTINE

Referring to FIGS. 3 and 12 to 16, the operation of the input output tasks (or "user interface") routine will now be discussed in detail. As stated above, this routine is preferably written in a language (such as Smalltalk) which enables the easy manipulation of screen input devices and screen output in the form of windows and icons, and these aspects will not be discussed in detail.

As shown in FIG. 3, the routine comprises a continuous loop, which reads the output of the user interface device 4 (and in the absence of an instruction, the data channel from the evaluation routine) from the data bus 7 at each pass. Referring to FIG. 12, the user interface routine employs a stage prototype table, 23, typically a partitioned area of memory 6 comprising a record for each type of stage the user might wish to include in the processing operation. Each type record comprises; an indication of the appearance of the icon corresponding to that stage (e.g. the address of the definition of that icon to be used by the display controller 2); a list of the input and output ports of that icon, and, for each port, an indication of the type of format of data which that port expects as input or produces as output (e.g. whether it is an array of image pixels of a single scalar value); and the address in memory 6 of a text file containing a written description of the nature of the operation concerned.

The user interface routine also maintains a table serving as a model of the workspace area appearance, shown as the workspace table 24. As each stage is introduced into the workspace area 10 of the screen, the user interface routine causes the CPU 3 to access the prototype record table for icon selected by the user, and copy the corresponding entry into the next available record in the workspace table 24. The workspace table 24 also contains additional fields, which comprise for each port an indication of the port and workspace table record number of the stage (if any) to which that port is connected by a link, and the address in the memory 6 of the data corresponding to that port (if any).

New Stages

With reference to FIGS. 3, 5 to 7, 12 and 13, the operation of the user interface routine corresponding to the creation of a new stage by the user will now be described in greater detail. By selecting a particular icon within the screen area 11c, as described above, the user signals his desire to include that stage in the sequence. The CPU 3 ascertains, from the data displayed within the areas 11a, 11b and 11c, the icon type which the user has selected and accesses the corresponding record within the prototype table 23. The record is then copied into a new record in the workspace table 24, in which all the data and link fields are empty. A display routine (not shown in detail) then accesses the graphical definition of the icon concerned and displays it at the position indicated by the user input device 4. The CPU 3 then generates a signal to enable the sequence table 20 to be updated, comprising an instruction to add a new stage, followed by an indication of the icon type, and the workspace table record number of the stage. Should the user wish to delete a stage, an equivalent procedure is performed by the CPU 3.

Linking Stages

Referring to FIGS. 3, 5 to 7, 12 and 14 the operation of linking two stages within the workspace 10 will now be discussed in greater detail.

When a user signals his intention to create a link, by "clicking" his mouse 4 over a port of an icon displayed on the screen, the CPU 3 reads the record for that icon in the workspace table 24, and determines from the field relating to the port in question what the data type for that port should be. The CPU 3 then instructs the display controller 2 to draw, and maintain on the screen, a line on the port in question and the cursor position indicated by the user, indicating the data type by displaying the line in a corresponding graphical format (for example, a thick line for image data). When the user completes the link by positioning his cursor at or close to a port of a second stage, the field corresponding to that port in the record for that stage in the workspace table 24 is accessed by the CPU 3. At this point, a series of test on the validity of the sequence specified by the link are performed by the CPU 3. Firstly, the two icon types and ports are compared; certain types of connection between two ports are generally impossible (for example, in many processing operations, an output port should not be connected to the input port of the same operation). Secondly, a check is made that the link is between one output port and one input port. Thirdly, a check is made that, of the two, the input port is not already connected. Fourthly, a check is made that the data types of the input port and the output port sought to be connected are the same. In the event of any of these conditions not being satisfied, an error is indicated to the user—for example the CPU 3 instructs the display controller 2 to erase the representation of the link. If the proposed link satisfies the criteria for validity, the CPU 3 accesses the records of the two stages in the workspace table 24 and writes into each port field the address (record and field number) in the workspace table 24 of the other port.

A signal is then generated to enable the sequence model held in the sequence table 20 to be updated. The signal comprises an instruction to update a link, and the workspace table reference (the record and field) of each of the linked stages. The process of un-linking two stages is analogous.

Input Data

Referring to FIGS. 3, 5 to 7, 12 and 15 the procedure performed by the CPU 3 executing the user interface routine upon receiving an input instruction from the user will now be described.

To instruct an input, the user will have positioned the cursor at or near an input stage in the workspace area 10. He will also have specified the input data for that input stage. In the case of an image, he may have selected that image from the index in areas 11e and 11f. In response to this action, the CPU 3 instructs the display controller 2 to generate a graphical representation of the image in the workspace area 10.

Preferably the icon for any image is an actual display of that image within a small window on the screen. By positioning the cursor upon the image icon, the user indicates a desire to move the image and the CPU 3 instructs the display controller 2 to move the image under the cursor until the cursor reaches an input stage. (In an alternative embodiment, the image icon itself is treated as the input stage, and may be linked directly to other stages).

In a preferred embodiment of the invention, any output image displayed at an output device is treated in exactly the same fashion as an image icon generated through the image index areas 11e and 11f, and may be moved by a user across the screen to an input stage to form an input for further processing. When the cursor position reaches an input stage, the CPU 3 indicates that the input has been accepted by displaying the image icon within the input stage. The CPU 3 then generates a signal to update the sequence store 20, comprising an instruction to write input data, the input stage record number (within the workspace table 24), and the input data filename or address (enabling the input data to be accessed from the memory 6).

A scalar input value could be generated by positioning the cursor over an input stage and typing in the value from a keyboard, but a preferred method involves the use of a slider bar input stage, such as icons 12d, 12h and 12i of FIG. 2. To generate or modify an input using such an input stage, the user indicates his intention of so doing (by clicking the mouse 4 over the slider portion of the icon). The CPU 3 then instructs the display controller 2 to move the slider with the cursor position.

Although the device appears to display a particular scalar value, it is preferred that the apparatus should not respond immediately to this input value since otherwise a rapidly moving cursor could cause the generation of a fast succession of input values, giving rise to a very large number of image processing operations. Accordingly, the CPU 3 counts the length of time the cursor rests in each position, and only proceeds to act upon the indicated input data value once the cursor has been at rest for, say, half a second. Some other signal could be employed, for example, a second click from the user input device 4.

Upon thus determining that the user has selected an input data value, the CPU 3 reads the position of the slider, and accepts the corresponding data value as the input. This input is then written to a file in the memory 6, and, as before, the filename is signalled to enable the updating of the sequence table 20. As an alternative to writing the data value to the memory 6, the CPU 3 could create a dummy file name comprising a preamble indicating that the following portion represented real data rather than a file address; this dummy filename including the actual value of the input scalar data could be signalled to update the sequence store 20. Whilst such an alternative is more economical of space in the memory 6, it does complicate the program structures employed.

Output Display

Figure 16:
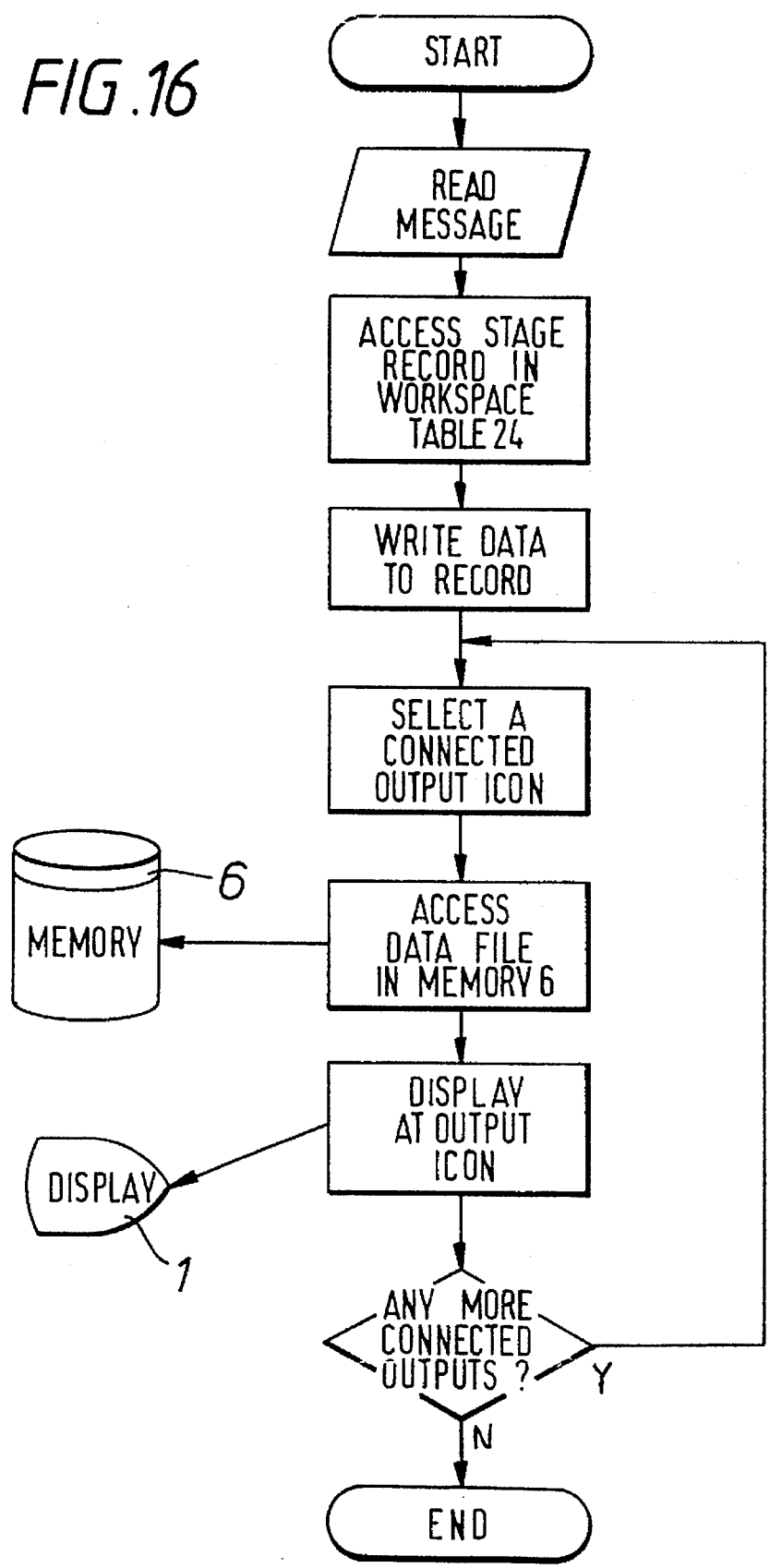
FIG. 16 shows schematically the flow of operation of sub-routine of the routine of FIG. 3 for displaying processed images.

Referring to FIGS. 3 and 16 the procedure performed by the CPU 3 under the guidance of the user interface routine 3a upon receiving a signal indicating the availability of data for output will now be described. The signal is read, and the data filename is written to the data field of the output port of the icon record in the workspace table 24 indicated by the signal. It will be recalled from the foregoing that such data is sent only where the sequence table 20 indicates that at least one of the successor stages to the stage concerned is an output stage. The identities of the icons which are indicated as being linked to that output port in the workspace table record are examined by the CPU 3 e.g., by accessing the corresponding records in turn, and when an output icon is encountered the CPU 3 accesses the memory 6, reads the data stored under the filename indicated by the signal, and instructs the display controller 2 to display a corresponding image at the location of the output stage, or writes the data to whatever other output device (e.g. separate high resolution monitor or printer) is specified by the output icon. In this manner, if several output stages are connected to the same port, the user interface routine may display all such outputs without any further signalling to or from the evaluation routines. This "forward data propagation" process could also be performed when, as described above, a user effects a new data input.

At periodical intervals (for example, at each pass), the user interface routine 3a may additionally check a list of all output icons held within the workspace table 24 and see whether data is available for a precursor icon and, in the event that data is available, display the data at the relevant output icon. This mechanism of data propagation could be used in addition to, or as an alternative to, that described above.

Output Display Manipulation

If the output icon is one indicating that the data is sent to an external device (e.g. a high resolution work station), that device will often include display manipulation controls, for example, altering the brightness or contrast of parts of the image. In the same way, it is advantageous that output images displayed upon the display 1 should be manipulable by the user to enhance his view, without in any way changing the image data itself. Two very desirable manipulation operations are, firstly, a scaling operation in which the size of the output display is increased or reduced, and, secondly, a "zoom" or selection operation, in which the user can select only part of the image for display. The combination of these two techniques is of further benefit to the user, since he can select a part of the image and then enlarge it to the original size of the whole. To give a user greater control in selecting the precise output format he desires, it is preferred that when a user specifies a change (for example, a 50% increase in size), the change is executed incrementally (i.e., the image grows in smooth increments from its original size to its enlarged size). Smooth incremental changes in image appearance can be provided using well known display graphics techniques, such as "double-buffering", see for example R. Salmon and M. Slater "Computer Graphics Systems and Concepts" published by Addison Wesley 1987.

In the foregoing, display manipulation operations which affect the manner in which an output image is displayed have been discussed as separate from image processing operations. The former operations (for example, enlarging an image or selecting a particular portion of an image for display) are percieved by the viewer to leave the image itself unchanged, and in fact the output data file itself is unchanged by these operations (which generally create a temporary display file including the manipulated displayed image, and over write this file with a new file when the user alters the manner of the display). The latter operations, by contrast, create a new permanent output image file.

However, in a preferred embodiment of the invention, the apparatus reduces the amount of image processing calculation necessary by taking cognizance of the form of the display. One example of this is as follows. If the user has manipulated the display of the output image so as to display only a portion of the image (say, one corner of the image), the CPU 3, as part of the user interface routine 3a, stores the display manipulation and records the co-ordinates of the portion of the image displayed within the entire image. These co-ordinates are then passed to the evaluation routine 3b, and, in any image processing request relevant to the output stage at which the image is displayed, the image processing request issued to the image processor 5 includes the co-ordinates.

Accordingly, the image processor 5 reads only those pixel values lying between the co-ordinates from each image data file within the memory 6 (and possibly a few neighbouring pixel values lying outside the co-ordinates where some form of "windowing" operation is necessary), and generates output data files of a reduced size. Calculation operations therefore take place only on an image array of reduced size, and memory use within the memory 6 may also be enhanced.

Any change of the parameters of the display are, of course, signalled by the user interface routine 3a to the evaluation routine 3b since subsequent output data and intermediate result data will require erasure.

Similarly, other parameters of the manipulation of the display selected by the user may be utilised to reduce the amount of processing required; for example, if a user selects a monochrome display, the colour pixel values may be ignored by the image processor 5 and if the user selects a low resolution display, correspondingly lower accuracy may be employed during the calculation stages. It will be apparent that this concept of performing only the processing required for the output the user desires has much in common with the principle above described of only performing those image processing operations which are necessary to generate the outputs required.

Composite Operation Stages

Figure 17:
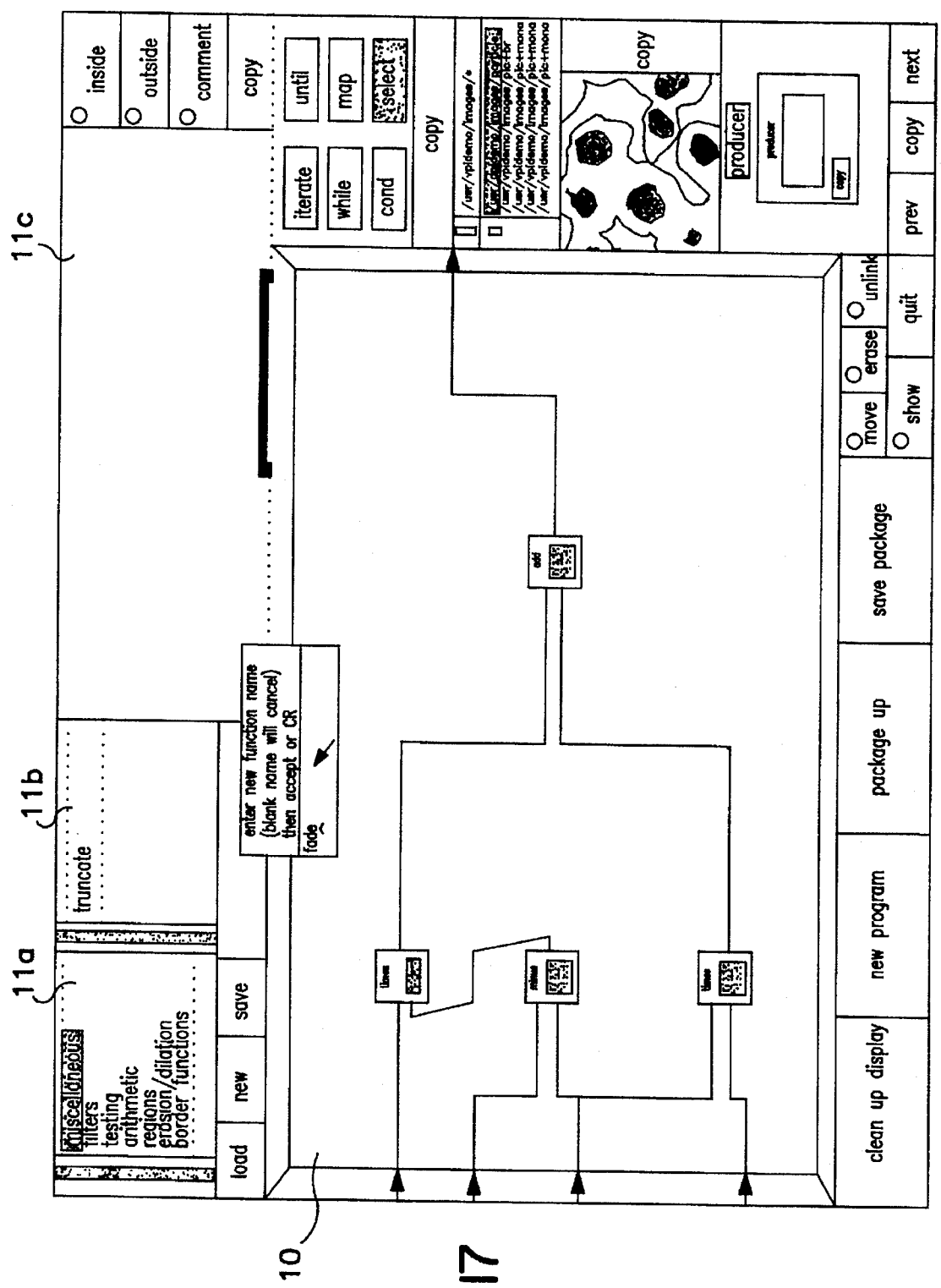
FIG. 17 shows a screen display generated by this embodiment of the invention.
Figure 18A:
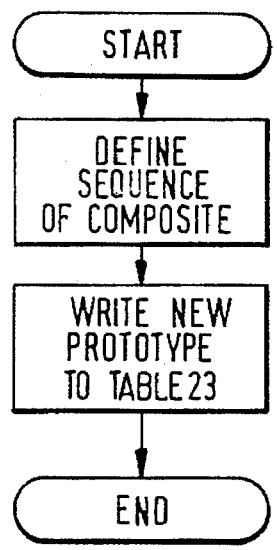
FIG. 18a shows schematically the flow of operations of the user interface routine in creating a composite operation.

As stated above, a stage may in fact comprise a plurality of separate image processing operations. The manner in which such composite operations are dealt with in this embodiment will now be discussed with reference to FIGS. 17 to 18b. In the event that a user has decided to create such a composite stage, he indicates his desire to save the stage for possible re-use by selecting the relevant area of the screen display. Referring to FIG. 18a, the CPU 3 executing the user interface routine 3a then prompts him to define the sequence which is to be saved as a composite stage, for example by creating a line under the cursor to enable him to draw a box within the workspace area 10 around the desired sequence. The CPU 3 then creates a new prototype stage record for the composite stage within the prototype table 23, allocating a new icon to represent the composite stage. The CPU 3 also prompts the user for an icon name, as shown in FIG. 17. The prototype record also includes the prototype records of all the stages of which the new stage is made up, and fields indicating the links between the stages (in the same manner as in the workspace table 24).

Figure 18B:
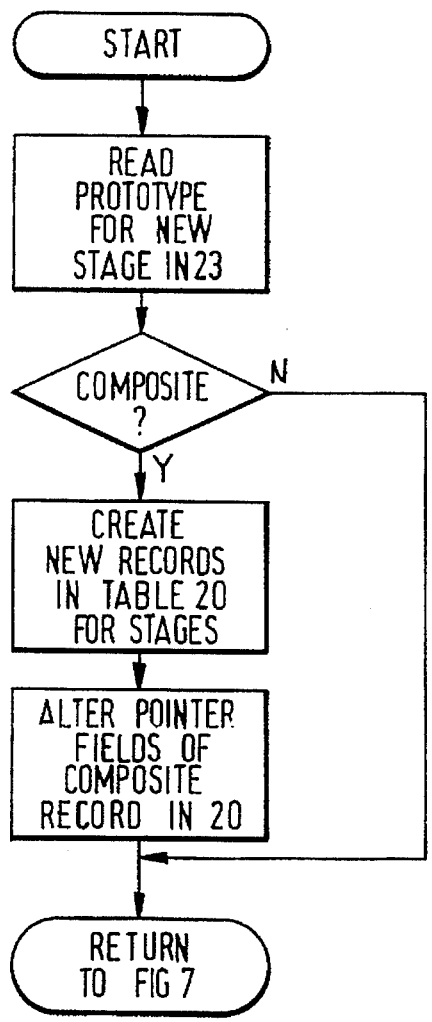
FIG. 18b shows schematically the flow of operation of the evaluation routine in evaluating a sequence containing such a composite operation.

Referring to FIG. 18b when the user calls this new stage into the workspace 10 to be assembled into a sequence, a record is written to the sequence table 20 in the usual manner. When, however, the stage is encountered during an attempt to evaluate the sequence, the CPU 3 upon reading the record will fail to recognise the identity of the stage as a "primitive" operation. Reference is therefore made to the prototype table 23 (or, if the evaluation tasks are performed by a separate machine, to a copy thereof held locally) and the list of constituent stages, and details of their connections, are read. The CPU 3 then expands the sequence table 20 by adding, for each constituent operation, a new record. The original record for the composite stage remains, but its precursor and successor fields are altered to point to, respectively, output and input fields of the new records so that, in effect, the sequence has been expanded to include a new subsequence. The CPU 3 then returns to the evaluation routine of FIG. 7 at the point where it left.

Composite Operation Display

Figure 19:
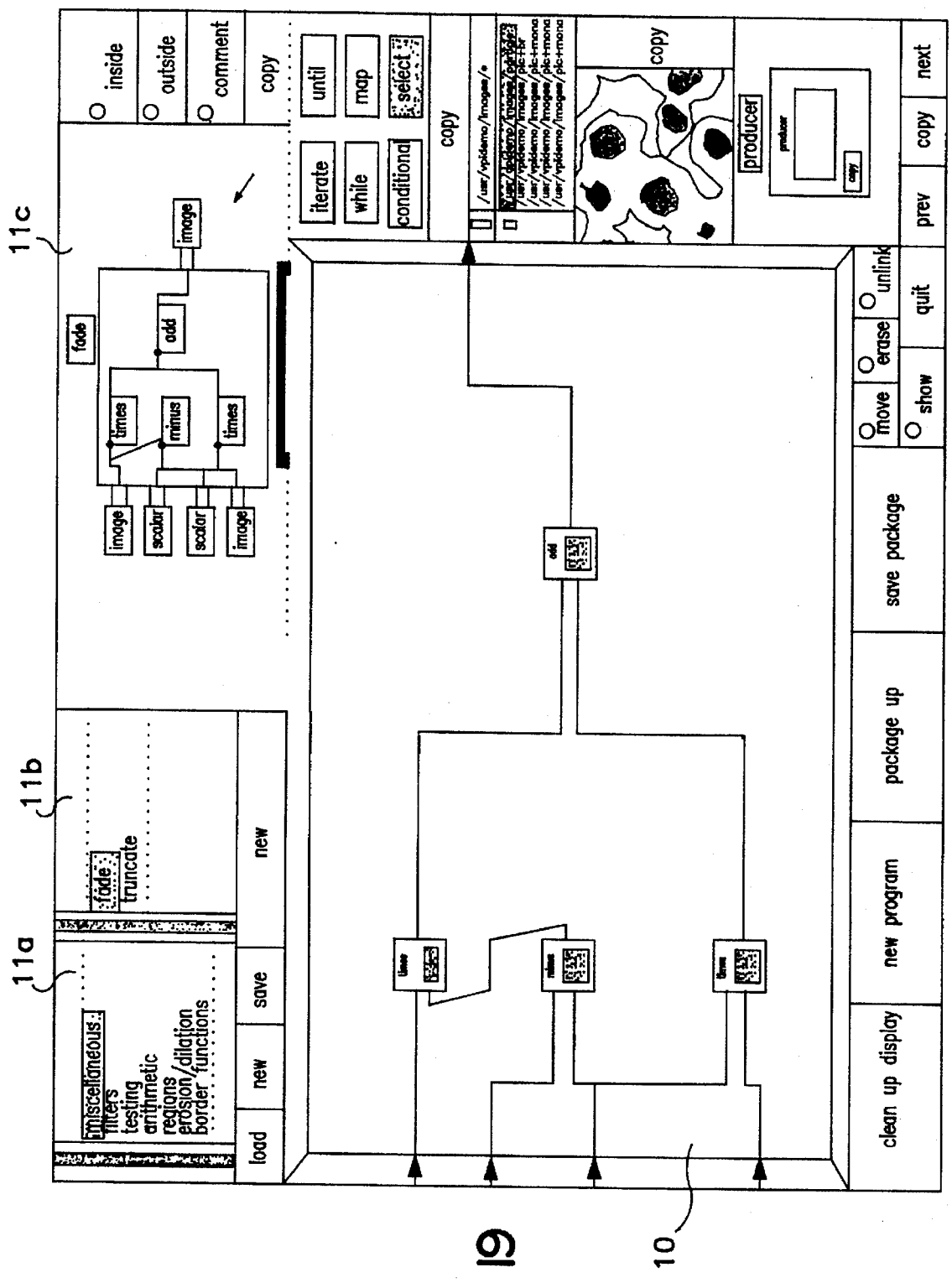
FIG. 19 shows further a further screen display produced by this embodiment of the invention.
Figure 20:
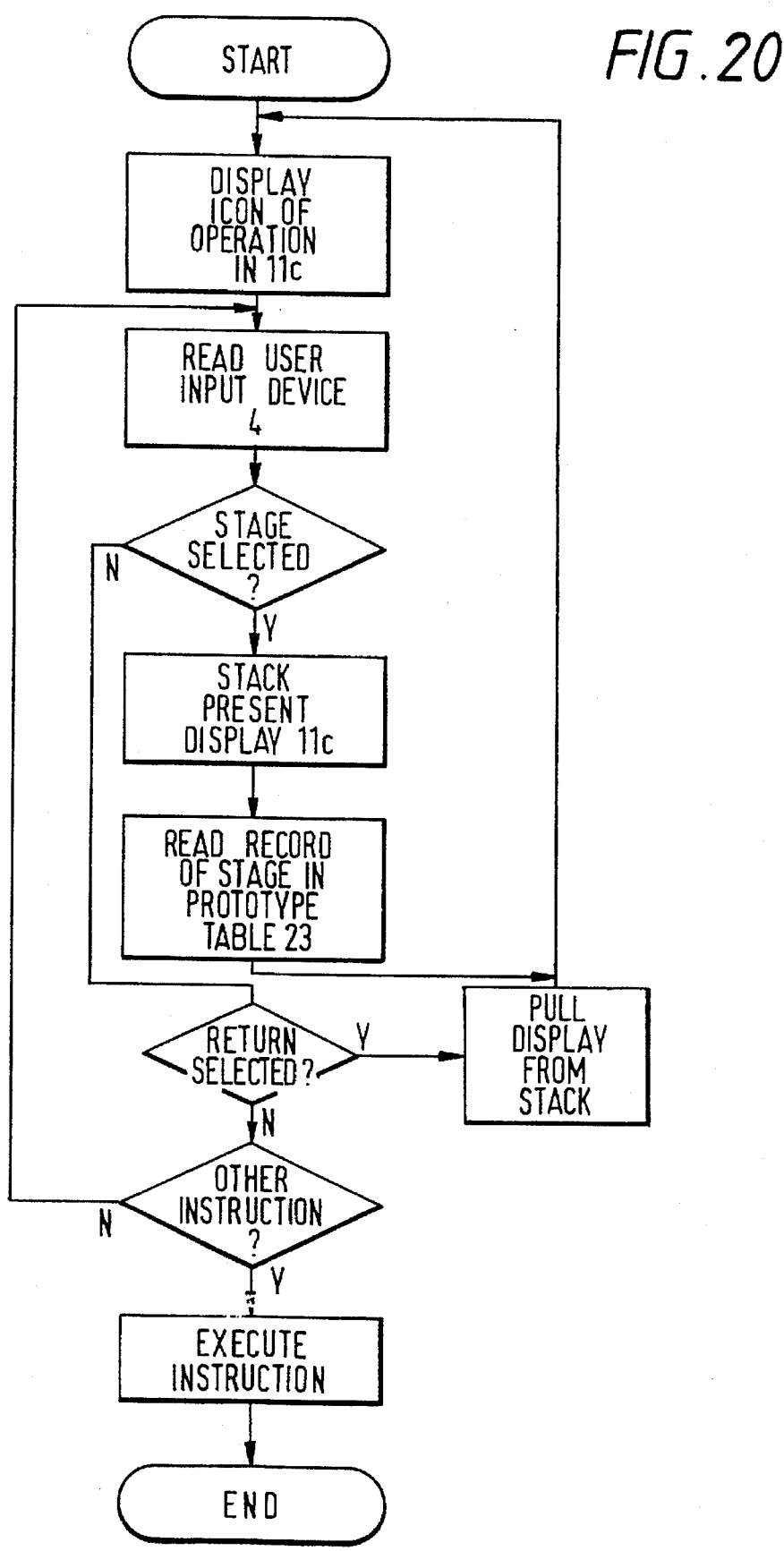
FIG. 20 shows schematically the flow of operations of the user interface routine of this embodiment in producing the display of FIG. 19.

Referring to FIGS. 19 and 20 the method of displaying the constituent parts of a composite operation, as a part of the user interface routine 3a executed by the CPU 3, will be described. If the user has signalled a desire to view the interior of a composite operation (i.e. those stages which define the subsequence of operations corresponding to that operation), by positioning the cursor on the "inside" area of the area 11c, the CPU 3 determines (from the contents of the area 11b) the desired icon, accesses the corresponding record in the prototype table 23, and instructs the display controller 2 to display the desired icon in the area 11c of the visual display 1.

Referring to FIG. 19, the icon contains a representation of the subsequence of which the operation is comprised. Referring to FIG. 20 the routine then scans the output of the user input device 4 for an instruction. By positioning the cursor over one of the constituent stages of the operation, the user can indicate a desire to view that operation in greater detail. That operation may itself be a composite operation. In the event that he does so, the CPU 3 stores, in a stack memory (not shown), an indication of the icon view presently displayed, and determines which stage the user has selected. The CPU 3 then accesses the record within the prototype table 23 for that stage, using the list of stages field, and presents a corresponding icon display within the area 11c. The display may indicate that the operation selected by the user was itself a composite operation comprising a sequence of stages.

Figure 21:
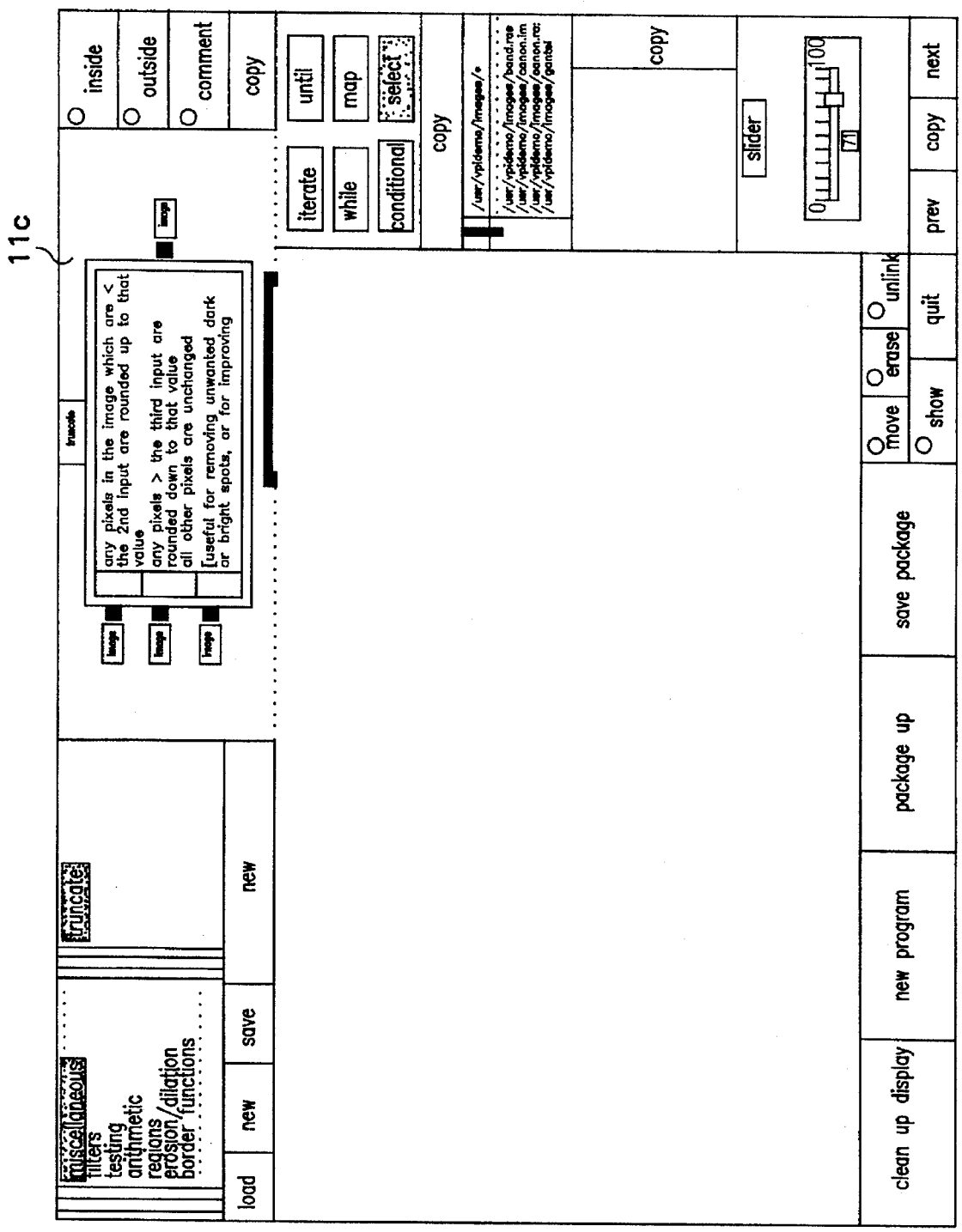
FIG. 21 shows schematically a further screen display produced by this embodiment of the invention.

At this point, the user may choose either to select one such constituent stage, in which case the present display is stacked as before and a new display is generated, or to return to the previous display, in which case the CPU 3 accesses the stack memory and pulls the previous display from the stack. In this manner, a user may browse hierarchically downwardly into greater detail and then return. By selecting the "comment" instruction via the appropriate area of the area 11c, the user may at any stage display the textual field associated with the operation the icon of which is presently displayed as shown in FIG. 21; in this event, the CPU 3 accesses the relevant record within the prototype table 23, and reads the text file name field, and then accesses the text file from the memory 6 and instructs the display controller 2 to display the text in place of the icon in area 11c.

Many available image processing devices are programmable, in that they can accept a sequence of instructions defining a program which may be called by name. In one embodiment, this facility of a suitable image processor 5 is utilised to enrich the repertoire of processing operations offered by the processor 5. This may be done in several ways, but in one example, upon creation of a new prototype stage in the prototype table 23, the evaluation routine attempts to evaluate the corresponding portion of the sequence. However, instead of sending image processing instructions to the image processor 5, they are assembled, in reverse order, in an instruction list in a store. A signal is then transmitted to the image processor 5 indicating that the following instructions should be accepted as a new operation within the repertoire of the image processor 5, and indicating the name by which the new operation is to be known. The list of instructions is then transmitted to the image processor 5.

Conditional Stages

Figure 22:
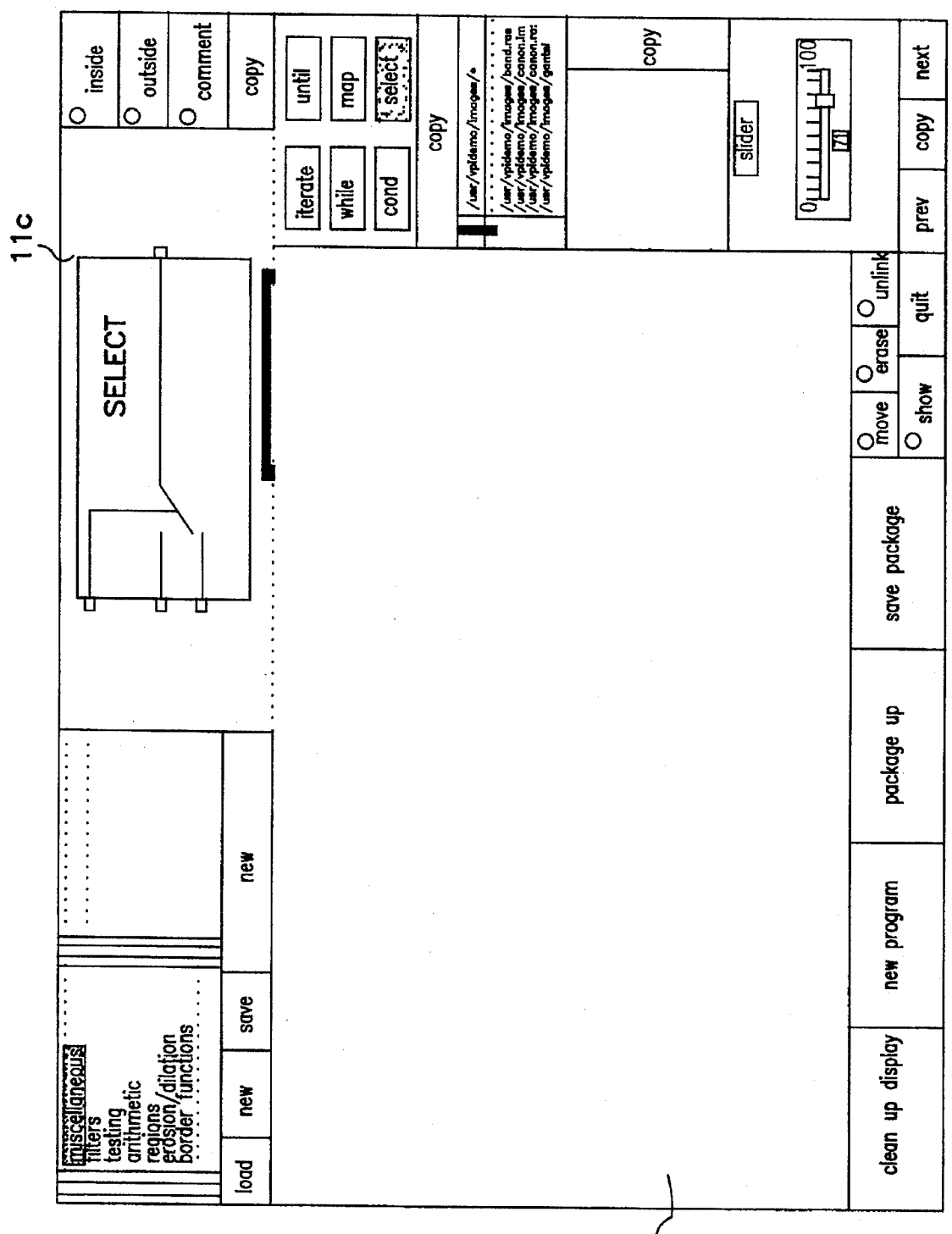
FIG. 22 shows schematically a further screen display produced by this embodiment of the invention.

Referring to FIG. 22, a user may wish to include within the sequence, conditional stages which select between potential inputs or precursor stages depending on the condition of another input. Such stages are represented as having several alternative input ports for data, an output port for data, and a control input for selecting one of the input ports.

During the attempt to evaluate the sequence, if the CPU 3 encounters the record of such a conditional stage, it firstly reads the record of the precursor stage pointed to by the control input port field, to ascertain whether data is available for the control input port. If such data is available, then the CPU 3 evaluates, in dependence upon the value of the data, which of the precursor stages pointed to from the data input port fields is to be selected, and selects the record for that stage. If the precursor stage to the control input port does not currently have data available, then the CPU 3 selects the record for that stage and proceeds to try and evaluate the control input. FIG. 7 will be understood to include the step of testing whether a given stage is a conditional stage, and, if so, of proceeding in this manner.

EVALUATION

Figure 23:
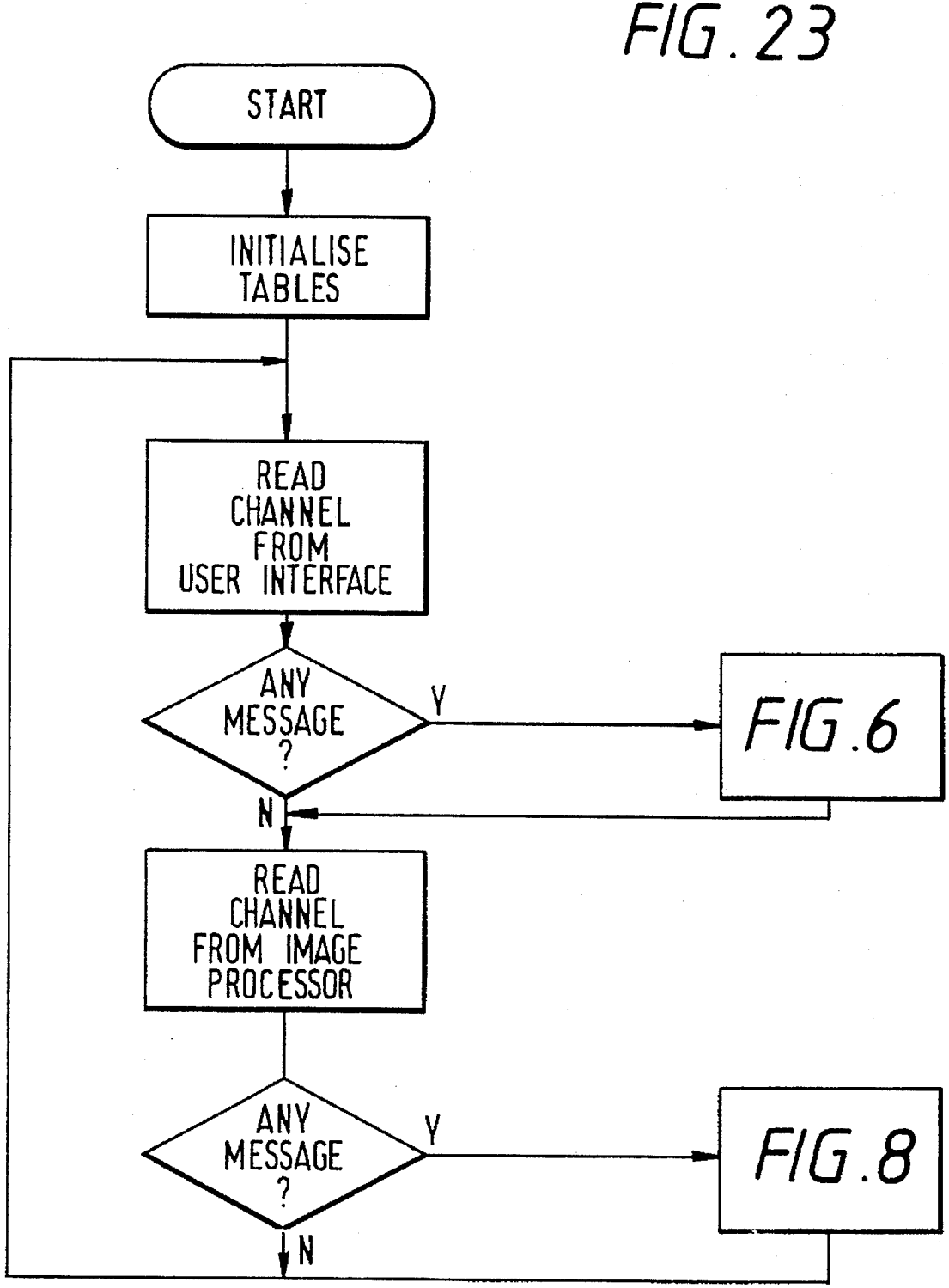
FIG. 23 shows schematically the flow of operations of the evaluation routine in this embodiment.

Referring to FIG. 23, the procedure performed by the CPU 3 under the guidance of the evaluation routine 3b will now briefly be described. The evaluation routine comprises a continuous loop in which firstly the channel from the user interface routine 3a is read, and any necessary action taken, and secondly the channel from the image processor 5 is read and any necessary action is taken. The error channel, if any, from the image processor 5 is also read.

Figure 8:
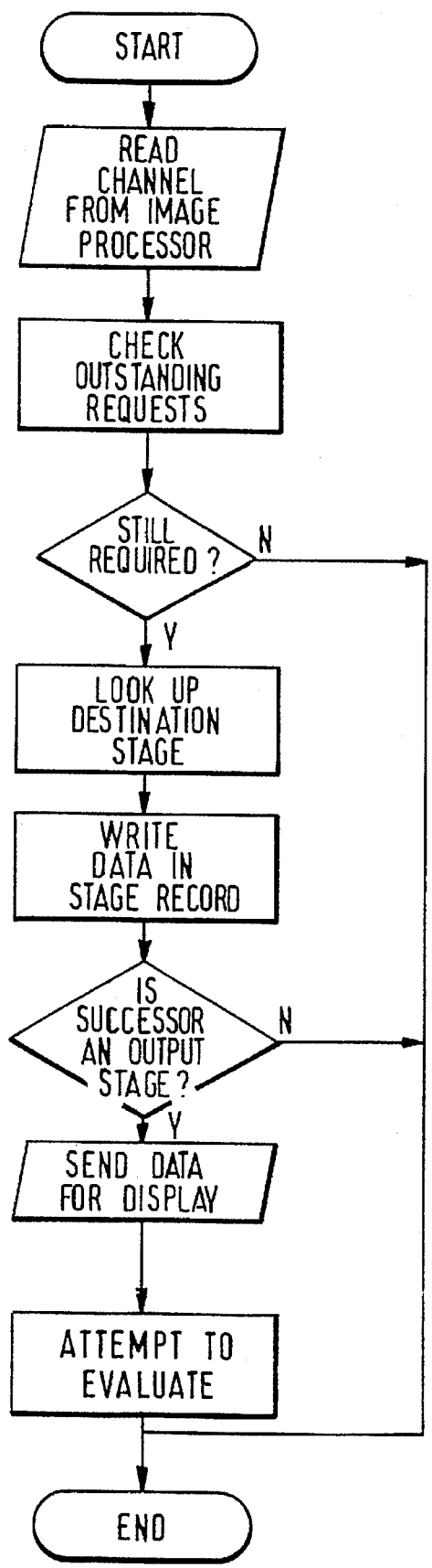
FIG. 8 shows schematically the flow of operations of a routine responsive to data resulting from an image processing operation in this embodiment.

In the event that there is a message from the user interface routine 3a, the routine shown in FIG. 6 is executed (and that of FIG. 9 if relevant); in the event of a message from the image processor 5, the routine of FIG. 8 is executed.

The request table 22 may additionally contain, for each request, a field indicating the time at which the request was transmitted to the image processor 5. In this case, the routine shown in FIG. 8 is modified by the addition of an extra checking step in which the CPU 3 determines the time at which an acknowledgement signal is received from the image processor 5 and determines from the request table 22 the elapsed time. In the event that a time greater than a predetermined limit has elapsed, the acknowledgement is ignored and the entry is deleted from the request table. Alternatively, the processor could review the request table at periodic intervals and delete from the request table any entry for which the elapsed time had exceeded a predetermined threshold. In this manner, data which is almost certainly no longer required due to an extended time interval is discarded.

This "time stamping" process could also be performed by the user interface routine upon receiving an indication of output data availability from the evaluation routine.

IMAGE PROCESSING

Referring to FIG. 4, the image processor 5 executes a continuous loop in which, at every pass, the data channel from the evaluation routine 3b is read. In the event of an instruction, the relevant image processing operation is executed by accessing memory 6. The instruction might also relate to a data manipulation operation (for example erasing a specific file in the memory 6); the image processor 5 is conveniently arranged to handle such operations also.

A summary of some preferred processing operations provided by the invention is as follows:

"add"

for scalars: add 1st input to 2nd—gives a scalar output for images: do pointwise addition of two images—gives an image output

DETAILS:

If one input is an image, the other input must either be an image or a scalar—the output will be an image.

"minus"

SUMMARY:

for scalars: subtract 2nd input from 1st—gives a scalar output for images: do pointwise substraction of two images—gives an image "times"

for scalars: multiply inputs together—gives a scalar output for images: do pointwise multiplication of two images—gives an image output

DETAILS:

If one input is an image, the other input must either be an image or a scalar—the output will be an image.

If one image is a scalar, the output will be the same size as the image input. The scalar input will be treated as though is was an image of the same size, with each pixel equal in value to the scalar.

If both inputs are images, then their top left hand corners are aligned, and the output image is the same size as the overlap of the two inputs. The pointwise multiplication is done with this alignment.

"divide"

SUMMARY:

for scalars: divide 2nd input from 1st—gives a scalar output for images: do pointwise division of two images—gives an image output

DETAILS:

If one input is an image, the other input must either be an image or a scalar—the output will be the same size as the image input. The scalar input will be treated as though it was an image of the same size, with each pixel equal in value to the scalar.

If both inputs are images, then their top left hand corners are aligned, and the output image is the same size as the overlap of the two inputs. The pointwise division is done with this alignment.

If the second input is zero (at any point), the result will be zero. In addition a warning message will be produced. [BEWARE: on some machines division by zero is very slow—so dividing an image by zero may take a lot longer than dividing it by a non-zero value.]

SUMMARY:
for scalars: return 1 (true) if the 1st input is equal to the 2nd; return 0 (false) otherwise—gives a scalar output.
for images: do pointwise equality test on two images—gives an image output.

DETAILS:
If one input is an image, the other input must either be an image or a scalar—the output will be an image.

If one image is a scalar, the output will be the same size as the image input. The scalar input will be treated as though it was an image of the same size, with each pixel equal in value to the scalar.

If both inputs are images, then their top left hand corners are aligned, and the output image is the same size as the overlap of the two inputs. The pointwise comparison is done with this alignment.

"not"
SUMMARY:
for scalars: return 1 (true) if the input is zero (false); return 0 (false) otherwise—gives a scalar output.
for images: do pointwise NOT on the image—gives an image output DETAILS:
If the input is an image, the output image will be the same size.

"<"
for scalars: return 1 (true) if the 1st input is less than the 2nd; return 0 (false) otherwise—gives a scalar output
for images: do pointwise less-than on two images—gives an image output DETAILS:
If one input is an image, the other input must either be an image or a scalar—the output will be an image.

If one image is a scalar, the output will be the same size as the image input. The scalar input will be treated as though it was an image of the same size, with each pixel equal in value to the scalar.

If both inputs are images, then their top left hand corners are aligned, and the output image is the same size as the overlap of the two inputs. The pointwise comparison is done with this alignment.

">"
for scalars: return 1 (true) if the 1st input is greater than the 2nd; return 0 (false) otherwise—gives a scalar output
for images: do pointwise greater-than on two images—gives an image output DETAILS:
If one input is an image, the other input must either be an image or a scalar—the output will be an image.

If one image is a scalar, the output will be the same size as the image input. The scalar input will be treated as though it was an image of the same size, with each pixel equal in value to the scalar.

If both inputs are images, then their top left hand corners are aligned, and the output image is the same size as the overlap of the two inputs. The pointwise comparison is done with this alignment.

"opening"

removes high-spatial frequency bright regions—the size of the regions is controlled by the 2nd input "closing"
removes high-spatial-frequency dark regions from an image—the size of the regions is controlled by the 2nd input.

"dilate"
dilate image (1st input) by square "disc" of given radius (2nd input)—gives an image output.

DETAILS:
The 1st input must be an image; the second input must be a scalar.

The output image is the same size as the input image. Let radius=max (0, 2nd input value); then the value at each point of the output image is the maximum of the values in the square of diameter (2*radius+1) centered on the corresponding pixel in the input image. If the square overlaps the edge of the input image, only the pixels within the image are inspected.

"erode"
erode image (1st input) by square "disc" of given radius (2nd input)—gives an image output.

"fill"
SUMMARY:
fill holes in a (binary) image

TYPICAL USAGE:
The input is a binary image. Then the output consists of a binary image in which all holes in the connected regions have been filled (with non-zero pixels).

DETAILS:
The input must be an image.

The output image is the same size as the input. The values of the foreground (non-zero) pixels are unchanged. Any background (zero) pixels which are 4-connected to the edge of the image are left at zero; the others are set to non-zero values.

"label"
SUMMARY:
label connected regions of a (binary) image—gives an image output DETAILS:
The input must be an image. It is assumed to be binary—i.e. all non-zero pixels are regarded as foreground, and all zero pixels are regarded as background.

Label gives each (4-connected) region a unique, integral, identifying number and sets all pixels of that region to that value. The label values will run from 1 to the number of connected-regions. The background pixels are set to 0.

"r on b"
SUMMARY:
given a labelled binary input, remove all regions adjacent to the edge of the image.

TYPICAL USAGE:
The input is a labelled binary image. (See label.) Then the output consists of an image similar to the input, except that all regions which are adjacent to the edge of the image are set to 0.

DETAILS:
The input must be an image.

The output image is the same size as the input. The output pixels have the same values as the input pixels, with the following exception: any pixel which has the same value as a pixel on the edge of the input image will be set to 0.

"truncate"
any pixels>the third input are rounded down to that value; all other pixels are unchanged. [Useful for removing unwanted dark or bright spots, or for improving display contrast.]

"extract"
extract all regions of an image whose area is between specified limits—gives an image output.
TYPICAL USAGE:
The first input is a labelled binary image. (See label.) Then the output consists of an image similar to the input, except that all regions with fewer than "2nd input" pixels, or more than "3rd input" pixels, are set to 0.
DETAILS:
The first input must be an image; the second and third inputs must be scalars.
The output image is the same size as the input. Let min=value-of-2nd-input, and max=value-of-3rd-input. Then the output pixels have the same values as the input pixels, with the following exceptions:

if there are <min pixels of a given input value, the corresponding output values are set to 0
if there are >max pixels of a given input value, the corresponding output values are set to 0.

"modulo"
SUMMARY:
for scalars: return the remainder when the 2st input is divided by the 2nd—gives a scalar output
for images: do pointwise modulus of two images—gives an image output
DETAILS
Definition of the modulus operation:

$$x \bmod y = x - y * floor(x/y), \text{ if } y \text{ is not equal to } 0 = x, \text{ if } y = 0$$

[floor(x)=(largest integer <=x)]

If one input is an image, the other input must either be an image or a scalar—the output will be an image.

If one image is a scalar, the output will be the same size as the image input. The scalar input will be treated as though it was an image of the same size, with each pixel equal in value to the scalar.

If both inputs are images, then their top left hand corners are aligned, and the output image is the same size as the overlap of the two inputs. The pointwise modulus is done with this alignment.

MODIFICATIONS

It will be apparent that the features of separating the user interface and evaluation tasks from the image processing tasks, and communicating asynchronously via data channels, enable the use of several parallel image processing devices, thus providing an even faster response to the user. Several such devices could be provided connected in parallel to the data channel from the CPU 3 operating the evaluation routine 3b, and provided all share access to the memory device 6, or some arrangement is made for a common data file address format, the evaluation routine need function no differently regardless of the number of image processors connected to the data channel. Some (well known) method of conflict resolution would be required within the routine operated by each image processor 5, to prevent several processors attempting to execute the same request.

Further, it will be apparent that the above described methods of executing the evaluation task also lend themselves to parallel computation. The sequence table 20 and output table 21 being located in a common memory store, upon reaching a stage record for which several precursor stages would require evaluation, rather than proceeding to evaluate each precursor stage in turn (as shown in FIG. 7), a separate processor could be assigned to evaluate each precursor stage so that different "branches" of the sequence are evaluated in parallel.

It will be apparent from the foregoing that, because the evaluation process described above proceeds through the sequence table 20 from the records of output stages back to stages where data is available, and because data is stored in the store 26 for stages which are not output stages (such data will be referred to as "intermediate result data"), and only erased where a change of input data or sequence definition renders it irrelevant, processing time spent by the image processor 5 is optimised because the same intermediate result data is not repetitively re-calculated whilst it remains valid. This brings considerably advantages in terms of speed of response to a user, which is advantageous in interactive apparatus.

However, since, as stated above, the volume of data required to represent a single image can be very large (typically on the order of a Megabyte), in an application where image processing time is at a lower premium than available memory space (for example, where multiple image processor devices are available but the size of the memory 6 is limited) it may be desirable to optimise the apparatus for memory capacity rather than speed of response. In this case, after each attempt to evaluate the sequence, the CPU 3 will transmit to the image processor 5 instructions to erase all intermediate result data files. Evaluation would therefore proceed from each output stage back to the relevant input stages of the sequence at each attempt.

Most preferred is an adaptive memory usage strategy, in which the apparatus monitors the fullness of the memory 6, and alters the operation of the evaluation routine accordingly to prevent overfullness. In its simplest form, such a strategy would involve generating a signal once a predetermined state of memory fullness is reached (for example, once the memory 6 is 90% full), upon receipt of which the evaluation routine 3b would commence the operation of the memory-optimised evaluation method briefly described above. However, more complex schemes in which a variable number of intermediate results (those required at a variable depth before the output stages) are stored in the memory 6 responsive to the level of fullness thereof, are also easily realised.

Although the invention has been described with reference to image processing, many of the inventive techniques herein are also applicable to other types of tasks to be assembled into sequences.

Various other changes, substitutions and modifications to the above-described embodiments may be made without departing from the spirit and scope of the invention, as particularly defined in the appended claims.

We claim:

1. A data processing apparatus comprising:
   processing means having a repertoire of basic data processing operations, each basic operation being performable by the processing means to generate processed output data;
   output means having a repertoire of at least one basic output operation for presenting data to a user of the apparatus;
   graphical user interface means having display means and user input means permitting a user to select and assemble on a display graphical representations of said basic processing operations and basic output operation, and permitting the user to specify data paths between the assembled operations so as to specify a sequence for execution of the assembled operations in accordance with a desired composite data processing operation;

wherein said basic processing operations can be assembled and represented by said graphical user interface means without the prior execution and without automatic execution of the assembled basic operations, and wherein the processing means is arranged to cause execution of a sequence of basic operations automatically in response to the user selecting said basic output operation and specifying a data path from a data output of one of the assembled basic operations to a data input of said output operation, so as to present to the user data processed in accordance with said composite data processing operation, and wherein the processing means does not automatically execute sequences of basic operations when assembled basic operations do not have data path specified directly or indirectly from a data output thereof to the data input of the basic output operation.

2. An apparatus according to claim 1, further comprising:

sequence store means for storing, for each basic operation in the specified sequence, a record representing the identity of the basic operation and identifying also any other basic operation in the sequence having an output connected by one of the specified data paths to an input of said basic operation, said other operations being referred to hereinafter as preceding operations in the specified sequence; and evaluation means responsive to the specification by the user of a data path connecting the output of a given one of the assembled basic processing operations to an input of said basic output operation to examine the stored record for said given operation to determine whether, following the performance of any operations preceding the given operation in the specified sequence, the given operation could be performed, and, if so, to examine each such preceding operation in the same way, wherein if it is determined that such preceding operations could be performed, the evaluation means is constructed to control the processing means so as to cause the performance of the preceding operations in the specified sequence.

3. Apparatus according to claim 2, in which the evaluation means is further constructed to examine the record of the specified operation and determine whether data is available to enable that operation to be performed, and, in the event that the operation could be performed, the evaluation means is arranged to generate a predetermined signal to instruct the processing means to perform the operation.

4. Processing apparatus according to claim 3, in which the evaluation means is arranged not to await the completion of the performance of the operation by the processing means.

5. Apparatus according to claim 3 or claim 4 in which data resulting from the performance of operations in the specified sequence is stored in a data store.

6. Apparatus according to claim 5 in which only predetermined ones of such resulting data are stored in dependence upon the fullness of the data store.

7. Apparatus according to claims 2, 3 or 4 in which the evaluation means is arranged so as to operate in response to said specifying of a data path to a data input of said output operation.

8. Apparatus according to claims 2, 3 or 4 in which the evaluation means can be arranged so as to operate automatically in response to a user instruction specifying an amendment of the assembled operations and data paths.

9. Apparatus according to claims 2, 3 or 4, in which the evaluation means can be arranged so as to operate automatically in response to a user instruction specifying an alteration to the data upon which the stages are to operate.

10. Apparatus according to claim 1, further comprising means for cancelling output operations in response to an invalidity criterion.

11. Apparatus according to claim 10, in which the invalidity criterion comprises a user instruction altering the data upon which the operations are to be performed.

12. Apparatus according to claim 10 or claim 11, in which the invalidity criterion comprises a user instruction specifying an amendment to the specified sequence in relation to operations preceding the output operation.

13. Processing apparatus according to claim 1, wherein said sequence may be specified to be recursive.

14. Image processing apparatus according to claim 1, processing means having a repertoire of predetermined image processing operations arranged, in response to a predetermined signal, to perform a corresponding such operation from the repertoire upon image data;

means for accepting user instructions to specify a plurality of such operations for sequential execution; and means for displaying a graphical representation of the sequence;

in which the graphical user interface means includes means arranged to determine whether a user-specified operation could validly be performed following the performance of operations preceding said operation in the specified sequence; and, if not, to so indicate to the user.

15. Apparatus according to claim 14, in which the means for accepting user instructions is arranged to make said determination prior to executing the specified operation.

16. Apparatus according to claim 15, arranged also to accept user instructions to specify operations upon data in formats other than that of image data, in which the means for accepting user instructions is arranged to make said determination in dependence upon whether the data resulting from the performance of the an operation preceding the specified operation in the specified sequence is in a suitable format for the performance of the specified operation.

17. Processing apparatus according to claim 1, in which said processing means having a repertoire of predetermined basic data processing operations is arranged, in response to a predetermined signal, to perform a corresponding such operation from the repertoire upon data in a first format; and in which the processing means is further arranged, in response to predetermined signals, to perform corresponding operations upon data arranged in a second format; and the graphical user interface means is arranged to represent a given operation in a manner in which is substantially independent of the format of data upon which it is specified to operate.

18. Apparatus according to claim 17, in which a composite graphical representation comprises said graphical representations of the assembled operations linked by lines; and, where a line links one or more operations which are defined with respect to a particular data format, the composite graphical representations indicate that format.

19. A user terminal for image processing apparatus comprising means for supplying predetermined signals to a data channel for controlling processing means having a repertoire of basic data processing operations including image processing operations, each basic operation being performable by the processing means to generate processed output data, and for controlling output means having a repertoire of at least one basic output operation for presenting data to a user of the apparatus, the user terminal further comprising:

graphical user interface means having display means and user input means permitting a user to select and assemble on a display graphical representations of said basic processing operations and basic output operation, and permitting the user to specify data paths between the assembled operations so as to specify a sequence for execution of the assembled operations in accordance with a desired composite image processing operation;

wherein said basic processing operations can be assembled and presented by said graphical user interface means without the prior execution and without automatic executions of the assembled basic operations by said processing means, wherein the user terminal is arranged to supply signals causing execution of a sequence of basic operations automatically in response to the user selecting said basic output operation and specifying a data path from a data output of one of the assembled basic operations to a data input of said output operation, so as to cause the processing means and the output means to present to the user data processed in accordance with said composite image processing operation, and wherein the user terminal does not arrange to supply signals to automatically execute a sequence of basic operations when no data path has been specified directly or indirectly from a data output to a data input of assembled basic operations.

20. Processing apparatus according to any one of claims 11, or 17 in which the processing means is image processing means, and the operations are image processing operations.

* * * * *

UNITED STATES PATENT AND TRADEMARK OFFICE
CERTIFICATE OF CORRECTION

PATENT NO. : 5,631,974
DATED : May 20, 1997
INVENTOR(S) : David Lau-Kee, et al.

It is certified that error appears in the above-identified patent and that said Letters Patent is hereby corrected as shown below:

COLUMN 1

Line 52, "or" should read --of--; and
Line 60, "Languages" should read --Languages,--.

COLUMN 11

Line 6, "input," should read --input)--;
Line 13, "data" should read --data is--; and
Line 43, "run--time" should read --run - time--.

COLUMN 13

Line 6, "stage--where" should read --stage - where--.

UNITED STATES PATENT AND TRADEMARK OFFICE
CERTIFICATE OF CORRECTION

PATENT NO. : 5,631,974
DATED : May 20, 1997
INVENTOR(S) : David Lau-Kee, et al.

It is certified that error appears in the above-identified patent and that said Letters Patent is hereby corrected as shown below:

COLUMN 16

Line 17, "devices—evaluating" should read --devices - evaluating--; and
Line 19, "that" should read --than--.

COLUMN 17

Line 17, "task" should read --tasks--.

COLUMN 24

Line 47, "is" should read --it--.

COLUMN 27

Line 23, "2st" should read --1st--.

UNITED STATES PATENT AND TRADEMARK OFFICE
CERTIFICATE OF CORRECTION

PATENT NO. : 5,631,974
DATED : May 20, 1997
INVENTOR(S) : David Lau-Kee, et al.

It is certified that error appears in the above-identified patent and that said Letters Patent is hereby corrected as shown below:

COLUMN 30

Line 38, "the" (second occurrence) should be deleted; and
Line 50, "in" (second occurrence) should be deleted.

COLUMN 32

Line 14, "11," should read --1--.

Signed and Sealed this

Fifteenth Day of September, 1998

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,631,974
DATED : May 20, 1997
INVENTOR(S) : David Lau-Kee, et al.

It is certified that error appears in the above-identified patent and that said Letters Patent is hereby corrected as shown below:

ON THE TITLE PAGE

Under [73] Assignee, "Canon Research Centre Europe, Ltd., Surrey, United Kingdom" should read --Canon Kabushiki Kaisha, Tokyo, Japan--.

Signed and Sealed this

Twenty-ninth Day of June, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,631,974
DATED : May 20, 1997
INVENTOR(S) : David Lau-Kee, et al.

It is certified that error appears in the above-identified patent and that said Letters Patent is hereby corrected as shown below:

On the title page item [73], "Canon Research Centre Europe, Ltd., Surrey, United Kingdom" should read --Canon Kabushiki Kaisha, Tokyo, Japan--.

Signed and Sealed this

Seventeenth Day of August, 1999

Attest:

Q. TODD DICKINSON

Attesting Officer

Acting Commissioner of Patents and Trademarks